US005560327A

United States Patent [19]
Brackett

[11] Patent Number: 5,560,327
[45] Date of Patent: *Oct. 1, 1996

[54] INTERNAL COMBUSTION ENGINE WITH IMPROVED CYCLE DYNAMICS

[76] Inventor: Douglas C. Brackett, 2535 Mason Oaks Dr., Valricho, Fla. 33594

[*] Notice: The term of this patent shall not extend beyond the expiration date of Pat. No. 5,375,566.

[21] Appl. No.: 317,237

[22] Filed: Oct. 3, 1994

Related U.S. Application Data

[63] Continuation-in-part of Ser. No. 149,032, Nov. 8, 1993, Pat. No. 5,375,566.

[51] Int. Cl.$^6$ .................................................. F02B 75/10
[52] U.S. Cl. ........................................ 123/55.7; 123/197.1
[58] Field of Search ............................... 123/55.5, 55.7, 123/197.1, 197.4, 197.3; 74/49, 50

[56] References Cited

U.S. PATENT DOCUMENTS

| | | |
|---|---|---|
| 130,371 | 8/1872 | Hendryx . |
| 139,499 | 6/1873 | Doolittle . |
| 283,558 | 8/1883 | Baumgarten . |
| 347,644 | 8/1886 | Salmon . |
| 410,432 | 9/1889 | McKaig . |
| 637,450 | 11/1899 | Doolittle . |
| 762,646 | 6/1904 | Morison . |
| 1,349,660 | 8/1920 | Buhl . |
| 1,505,856 | 8/1924 | Briggs . |
| 1,687,425 | 10/1928 | Briggs . |
| 1,825,096 | 9/1931 | Schwemlein . |
| 2,312,057 | 2/1943 | Williams . |
| 2,366,237 | 1/1945 | Clausen . |
| 2,513,514 | 7/1950 | Poage . |
| 3,087,342 | 4/1963 | Caddell . |
| 3,195,420 | 7/1965 | Johannsen . |
| 3,827,237 | 8/1974 | Linder et al. ............................ 60/274 |
| 3,961,607 | 6/1976 | Brems ................................. 123/78 R |
| 4,073,196 | 2/1978 | Dell ......................................... 74/52 |
| 4,270,395 | 6/1981 | Grundy .................................... 74/49 |
| 4,339,960 | 7/1982 | Senft ....................................... 74/50 |
| 4,370,901 | 2/1983 | Bolen ...................................... 74/44 |
| 4,408,578 | 10/1983 | Konther ............................... 123/56 R |
| 4,459,945 | 7/1984 | Chatfield ............................ 123/56 C |
| 4,463,710 | 8/1984 | McWhorter ......................... 123/48 B |
| 4,485,768 | 12/1984 | Heniges ............................... 123/48 B |

(List continued on next page.)

FOREIGN PATENT DOCUMENTS

| | | |
|---|---|---|
| 336037 | 6/1920 | Germany . |
| 584082 | 8/1933 | Germany . |
| 1957665 | 6/1970 | Germany . |
| 61-241518 | 10/1986 | Japan . |
| 112767 | 10/1918 | United Kingdom . |
| 533047 | 2/1941 | United Kingdom . |

OTHER PUBLICATIONS

SAE Technical Paper No. 941039, Close et al., Feb. 28, 1994 Perfect Engine Balance Via Collins Scotch Yoke Technology.
Design News, Oct. 7, 1985, Author Unknown, Page Unknown.
SAE Technical Paper Series Paper No. 930314, Mar. 1, 1993 The Compact Collins Scotch Yoke Engine More Progress.
International Publication No. WO 94/03740, 17 Feb. 1994 Brackett, Douglas C.

*Primary Examiner*—David A. Okonsky
*Attorney, Agent, or Firm*—Selitto & Associates

[57] ABSTRACT

A reciprocating piston internal combustion engine has a conjugate drive motion translator. The engine is horizontally opposed with each shuttle having a pair of pistons attached at the ends of a pair of oppositely extending arms. A centrally located aperture in the shuttle accommodates the crankpin and incorporates a pair of conjugate bearings bolted to the shuttle. The conjugate bearings mesh with mating conjugate drivers rotatably mounted upon a crankpin and forming the interface between crankshaft and shuttle. The cycle dynamics of the engine may be matched to the thermodynamics of a selected power cycle and fuel by adjusting the shape of the conjugate drivers and conjugate bearings.

31 Claims, 20 Drawing Sheets

U.S. PATENT DOCUMENTS

| | | | |
|---|---|---|---|
| 4,512,291 | 4/1985 | Kirk | 123/56 BC |
| 4,584,972 | 4/1986 | Jayne et al. | 123/56 C |
| 4,598,672 | 7/1986 | Jayne et al. | 123/56 BC |
| 4,664,077 | 5/1987 | Kamimaru | 123/78 A |
| 4,685,342 | 8/1987 | Brackett | 74/50 |
| 4,779,472 | 10/1988 | Brackett | 74/50 |
| 4,803,890 | 2/1989 | Giuliani et al. | 74/131 |
| 4,856,917 | 8/1989 | Schröder et al. | |
| 4,887,560 | 12/1989 | Heniges | 123/78 F |
| 4,915,019 | 4/1990 | Hovaguimian | 92/136 |
| 4,977,864 | 12/1990 | Grant | 123/50 B |
| 4,979,427 | 12/1990 | Pfeffer et al. | 92/60.5 |
| 5,076,220 | 12/1991 | Evans et al. | 123/90.31 |
| 5,259,256 | 11/1993 | Brackett | 74/49 |
| 5,297,448 | 3/1994 | Galvin | 123/197.4 |
| 5,375,566 | 12/1994 | Brackett | 123/55.5 |

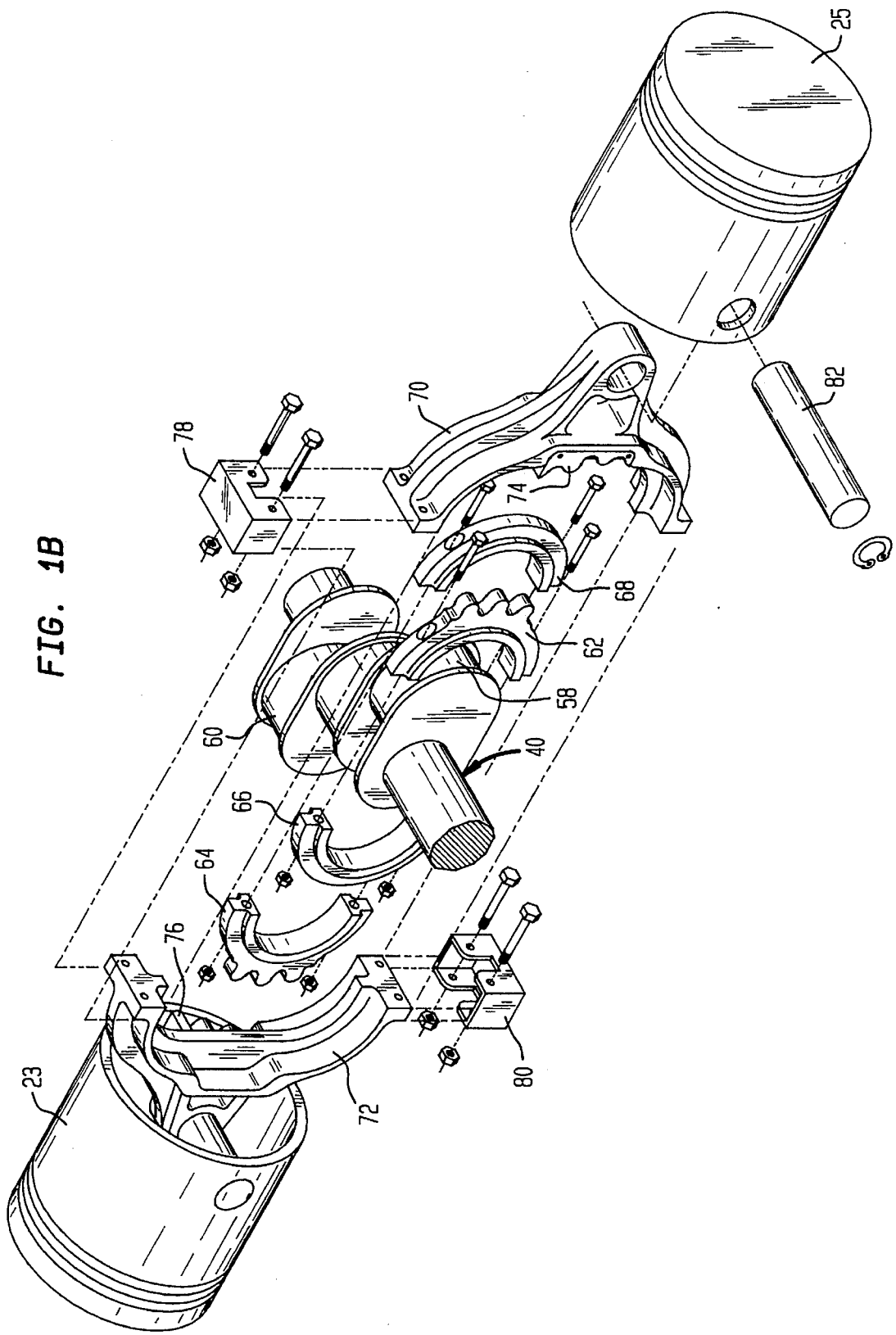

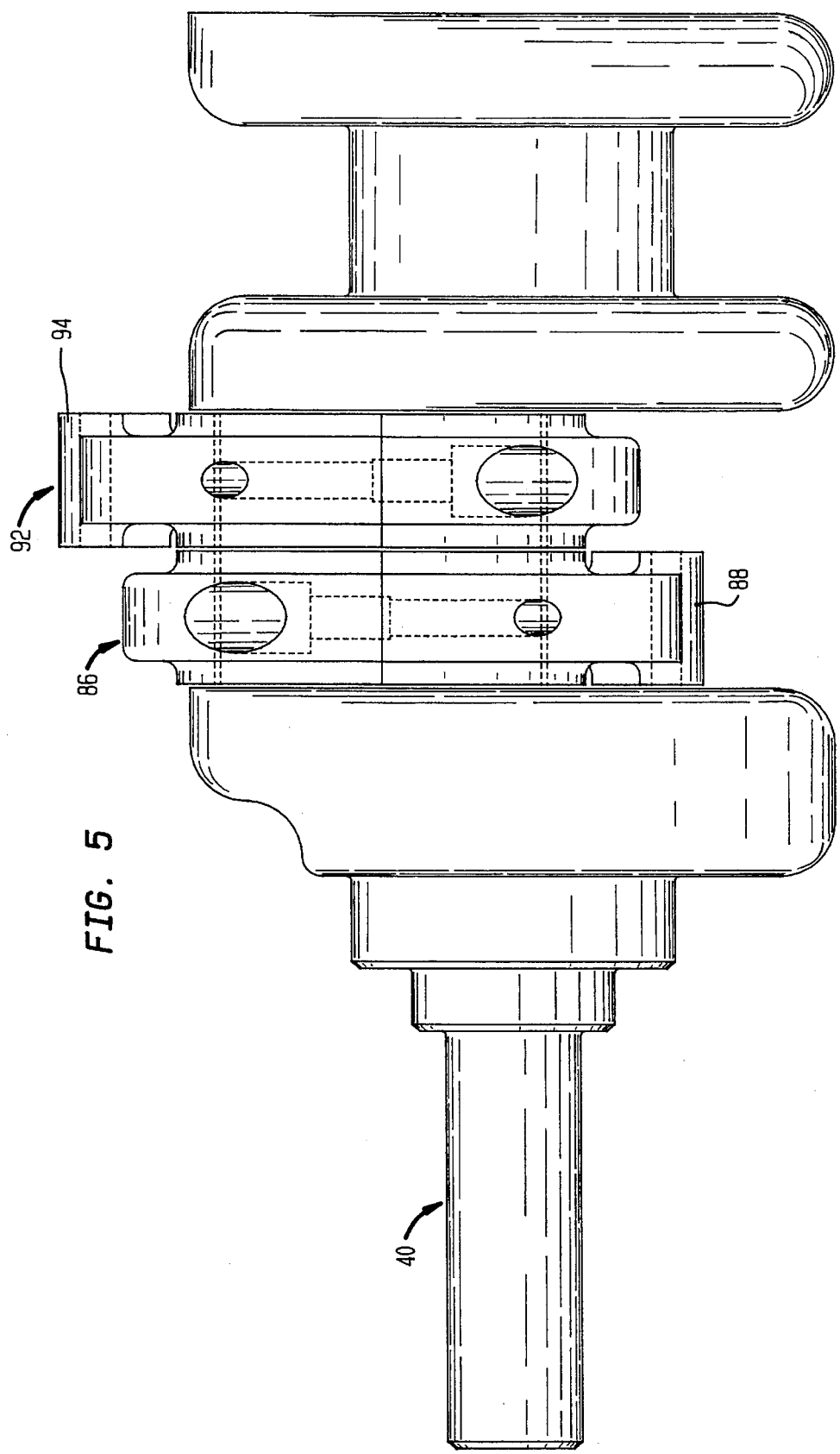

INTERNAL COMBUSTION ENGINE WITH IMPROVED CYCLE DYNAMICS

CROSS REFERENCE TO RELATED APPLICATION

This is a continuation-in-part of application Ser. No. 08/149,032 filed Nov. 8, 1993 and now U.S. Pat. No. 5,375,566.

FIELD OF THE INVENTION

The present invention relates to internal combustion engines, and more particularly to reciprocating piston engines utilizing conjugate drive rectilinear-to-rotary motion translation wherein the cycle dynamics may be altered to match the thermodynamics of combustion yielding a more efficient engine and lowering pollutants in the engine exhaust.

DESCRIPTION OF THE PRIOR ART

Numerous engine designs have been proposed over the years for achieving various performance characteristics. The most familiar design is the conventional reciprocating piston internal combustion engine. Typically, the reciprocating piston engine utilizes a connecting rod to connect the piston(s) to the offset crankpins of a crankshaft thereby translating the linear reciprocating motion of the pistons to rotary motion. The connecting rod is articulable at both ends relative to the piston and the crankpin. At the piston end of the connecting rod, a wrist pin passes through the piston and the connecting rod joining them. This design is known in the art as the slider crank engine. While the slider crank design has proven to have great utility, it does have certain disadvantages and limitations. For instance, the number and weight of the parts of the engine, as well as the exterior dimensions for a particular displacement, appear to have been reduced to a near minimum. Further, it is not likely that power loss due to friction will be significantly reduced owing to the side loading of pistons and the pendulous motion of the connecting rods. In addition, pumping losses and other intrinsic inefficiencies occurring during each stroke of the cycle are not likely to be improved due to the fixed cycle dynamics of the slider crank engine, wherein the Top Dead Center (TDC) position of the crankshaft invariably corresponds to Top Piston Position (TPP) in the cylinder and the Bottom Dead Center (BDC) position corresponds to Bottom Piston Position (BPP).

Of course, the cycle dynamics of an engine (piston position/velocity and cylinder volume/rate of volume change as a function of crankshaft position) has a direct effect upon the thermodynamics of the engine in terms of power and efficiency and upon the chemical reactions driving the engine (exothermic oxidation of fuel) in that the cycle dynamics effect the pressure/temperature and rate of change thereof in the reaction vessel. Each of the foregoing determine the equilibria established during operation of the engine and the nature of the exhausted end products of combustion.

A variety of expedients for improving the slider crank engine have been considered over the years, including devices for altering the cycle dynamics of the engine. For example, the following devices have been proposed: pistons with variable compression height, see U.S. Pat. No. 4,979,427; connecting rods with variable length, see U.S. Pat. No. 4,370,901; connecting rods with a pair of wrist pins, one of which is connected to an internal slider and the second of which traverses an arcuate slot, see U.S. Pat. No. 4,463,710; and supplemental pistons and cylinders converging into a shared combustion chamber, see U.S. Pat. No. 3,961,607. Each of these devices results in a more complex engine having more parts and greater reciprocating and total mass.

The scotch yoke has been employed in certain engine designs seeking improved cycle dynamics over the slider crank engine. For example, see U.S. Pat. Nos. 4,584,972, 4,887,560, 4,485,768 and 4,803,890. While these efforts certainly must be considered creative, they either utilize a great number of parts in a complex arrangement or are plagued by certain weaknesses encountered in the traditional scotch yoke design. In the traditional scotch yoke engine, the pistons are connected by a rigid, non-articulable connecting rod to a shuttle having a slot therein which accommodates the crankpin of a crankshaft. The motion of the shuttle is constrained to a linear path by guide surfaces and the crankpin slides within the slot as the crankshaft rotates through its range of motion. Thus, the scotch yoke provides a means for converting the reciprocating linear piston motion to rotary crankshaft motion. The slot within the shuttle must be at least as wide as the crankpin diameter and at least as long as the diameter of crankpin travel. A pair of competing objectives in the design of scotch yokes is to eliminate friction, as well as clearance at the crankpin/slot interface. Friction results in energy loss in the conversion from linear to rotary motion and also in wear of the scotch yoke. Clearance at the interface results in a loss of motion translation (rotary to linear and vice versa), i.e., there is no translation during traversal of the clearance gap, and in brinelling, spalling and vibrations when the unrestrained driving element accelerates across the clearance gap and collides into the driven element. As has been recognized for many years, the consequences of clearance and friction at the slot/crankpin interface are energy inefficiency and excessive wear and tear.

A variety of methods have been proposed to simultaneously achieve minimum crankpin to slot clearance and friction. For example, in U.S. Pat. No. 1,687,425 a spring urged lever presses against the crankpin to eliminate excess clearance. In U.S. Pat. No. 2,366,237 the shuttle includes a bearing block having a center roller bearing for the crankpin and side roller bearings to reduce friction between the block and the remainder of the shuttle. U.S. Pat. No. 4,685,342 to Douglas C. Brackett, the inventor herein, entitled DEVICE FOR CONVERTING LINEAR MOTION TO ROTARY MOTION OR VICE VERSA, discloses a scotch yoke type device having a pair of opposing, offset bearing surfaces, one on either side of the crankpin slot in the shuttle. A corresponding pair of roller bearings are arranged on the crankpin coaxially and laterally displaced from one another such that each aligns with one of the pair of opposing, offset bearing surfaces of the slot when the crankpin is inserted into the slot. In this manner, clearance at the crankpin/slot interface can be minimized to manufacturing tolerances and friction is reduced to the rolling friction of a roller bearing. The inventor herein has recently proposed additional solutions to this traditional problem inherent in the scotch yoke design. In U.S. Pat. No. 5,259,256 entitled Motion Converter With Pinion Sector/Rack Interface, a simple and effective arrangement wherein a pair of opposing conjugate bearing "racks" disposed within the shuttle slot capture a pair of free floating conjugate driver "sector" segments disposed about the crankpin of the crankshaft to be turned is disclosed.

The present application then seeks to provide a new and novel engine having improved cycle dynamics which employs a conjugate drive motion translator. It is an object to produce a highly efficient engine having a high power to weight ratio, reduced friction and pumping losses, which uses a minimum of moving parts, and which also has reduced pollution emissions.

SUMMARY OF THE INVENTION

The problems and disadvantages associated with conventional reciprocating piston internal combustion engines are overcome by the present invention which includes a reciprocating piston internal combustion engine having a cylinder for slideably receiving a corresponding mating piston therein moving in synchronous reciprocation relative to the rotation of a crankshaft. A shuttle having an aperture therein is affixed to the piston, with the aperture receiving a crankpin of the crankshaft for interconverting between reciprocating motion of the piston and rotary motion of the crankshaft. At least a portion of the peripheral boundary defining the aperture has a trackable profile. A pair of tracking conjugate drivers are independently rotatably mounted side-by-side upon the crankpin. The tracking conjugate drivers have a lobed portion for engaging the trackable profile and a cap portion for retaining the conjugate drivers upon the crankpin.

BRIEF DESCRIPTION OF THE FIGURES

For a better understanding of the present invention, reference is made to the following detailed description of an exemplary embodiment considered in conjunction with the accompanying drawings, in which:

FIG. 1B is an enlarged exploded perspective view of the crankshaft and piston assembly shown in FIG. 1A;

FIG. 5 is an enlarged side view of the crankshaft and assembled conjugate drivers depicted in FIG. 2;

FIG. 20b is an enlarged view of segments of FIG. 20a.

DESCRIPTION OF THE EXEMPLARY EMBODIMENTS

Figure 1A:
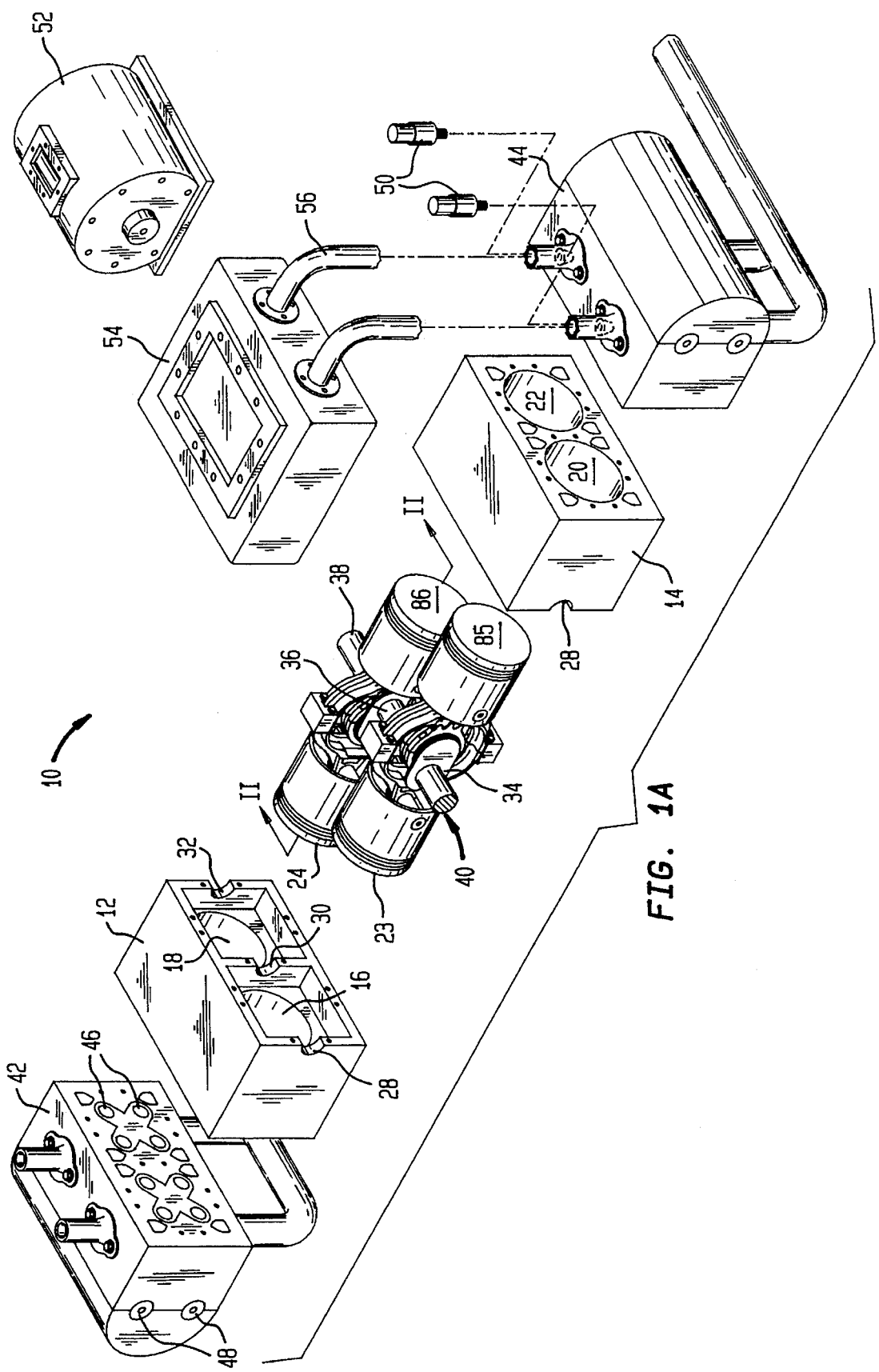
FIG. 1A is an exploded perspective view of a first embodiment of the present invention.
Figure 2:
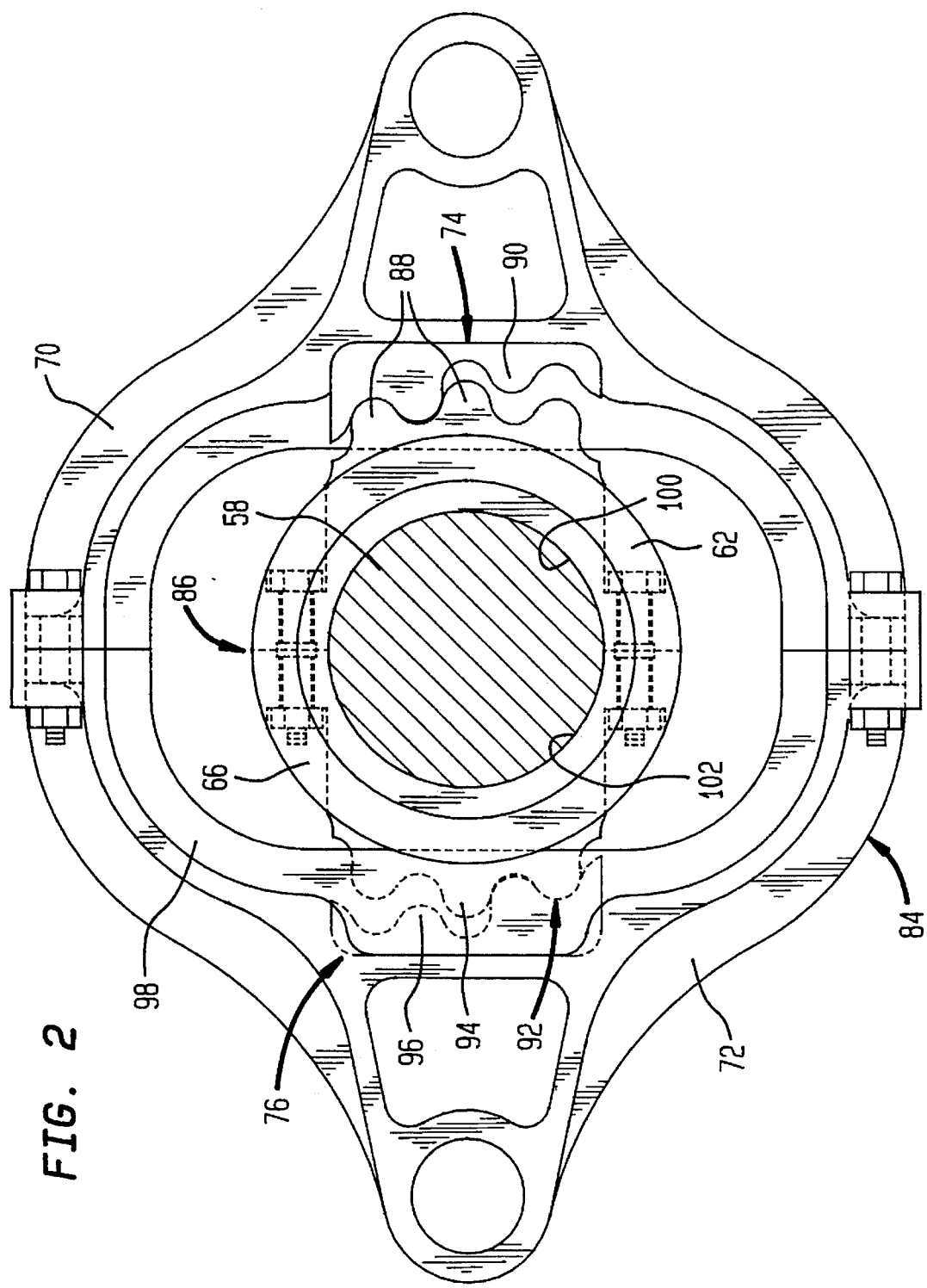
FIG. 2 is a partially cross-sectional view in elevation of the crankshaft and A-rod assembly depicted in FIG. 1A taken along line II—II and looking in the direction of the arrows.

FIG. 1A shows an engine 10 constructed in accordance with the present invention. The engine 10 has a pair of horizontally opposed cylinder blocks 12, 14 each having a pair of cylinders 16, 18 and 20, 22 for slideably receiving corresponding pistons 23, 24, 25 and 26 therein. Three main bearings 28, 30 and 32 receive the main bearing journals 34, 36 and 38 of a crankshaft 40 therein when the blocks 12 and 14 are assembled. Bearing inserts, surface treatment, etc. may be employed in a conventional manner but for simplicity of illustration are not depicted. As in conventional opposed engines, the cylinder blocks comprising the crankcase are held together by suitable studs or through bolts (not shown). A pair of conventional cylinder heads 42, 44 are affixed to the cylinder blocks 16, 18 in a manner as would be known in the art. In the embodiment shown, the heads 42, 44 have four valves 46 per cylinder and are actuated by a pair of overhead camshafts 48. Fuel/air supply is conventional, being accomplished, for example, by fuel injectors 50, as shown in the embodiment depicted. Alternatively, a carburetor system could be used. A supercharger 52 may be used with the present invention to improve volumetric efficiency and thereby more closely realize the optimum fuel air mixture over the operable range of RPMs. The cycle dynamics of the invention may be designed to utilize a supercharger more effectively than a comparable slider crank engine as shall be discussed more fully below. The supercharger 52 would discharge into an air plenum 54, the pressurized air being distributed to the cylinders via runners 56. The means by which the reciprocating linear motion of the pistons is converted to rotary crankshaft motion shall now be described in reference to FIG. 1B which shows the crankshaft 40 having a pair of offset crankpins 58, 60 upon each of which may be installed a pair of split rotatable conjugate drivers having a lobed portion 62, 64 and a cap portion 66, 68. The lobed portions 62, 64 are assembled to the cap portions 66, 68 by through bolts and mating nuts as shown, or in another conventional manner, such as providing a threaded aperture in one or the other portion to receive a bolt. As could be expected, the interior peripheral surface of the lobe and cap portions may be adapted to receive a bearing insert or some other friction reducing coating to allow a close fit to the crankpin while remaining freely rotatable thereon. The crankshaft 40 is basically conventional and equivalent to that which would be used in a slider crank engine. Dimensionally, however, the crankshaft 40 would be customized to the present invention with respect to bearing journal and crankpin diameter and width, as well as, counter weight dimensions. A pair of A-shaped connecting rods 70, 72 hereinafter "A-rods", attach at their respective legs to form a shuttle assembly disposed about each crankpin 58, 60. A bearing conjugate 74, 76 attaches to each A-rod and engages an associated conjugate driver lobed portion 63, 64 when the A-rods, e.g., 70, 72 are assembled together to form a shuttle assembly as is shown in FIG. 2. The interaction between the crankshaft conjugate drivers and conjugate bearings accounts for the conversion of linear piston and shuttle motion into crankshaft rotation as can be appreciated most easily by examining FIGS. 8A–8D and the corresponding description as shall be set forth below. A gusset box 78, 80 may be employed to provide a strong joint between the A-rods 70, 72 making up the shuttles. In the alternative, the shuttle assemblies can be formed as a unit as shown in the embodiment depicted in FIGS. 7 and 8A–8D. In that instance, the shuttle assemblies could be designated "O" rods. Pistons 23, 25 are attached to respective A-rods 72, 70 via conventional wristpins 82. While the pistons need not articulate on wristpins as in slider crank engines, this mode of connection was employed because it represents a utilization of existing technology, i.e., existing pistons and wrist pins. In the alternative, the pistons could be solidly bolted to the A-rods or O-rods or made integrally with them.

Given the overall design depicted in FIGS. 1A and 1B, it can be anticipated that the present invention will exhibit certain beneficial attributes normally associated with scotch yoke engines. For example, like scotch yoke designs, this design, by eliminating connecting rods, substantially reduces side thrust of the piston(s) against the cylinder wall since the shuttle travels in a straight line with the side loads being divided approximately equally between two pistons. This results in a reduction in the frictional losses due to piston side loading. Further, since there is a reduction in side loading, a better seal can be effected by the piston rings. Better ring seal prevents blowby and the attendant HC pollution and dilution of engine lubricant with fuel. Reduced side loading also permits a smaller piston skirt to be employed thereby shaving weight from the reciprocating mass and increasing engine performance and efficiency. The present invention also has the balance characteristics of scotch yoke engines which exceed the pendulous slider crank engine, eliminating the need for expensive counter-rotating balance shafts which have come into common use.

In addition, the present invention exhibits decreased engine size as compared to slider crank engines of equal displacement. In the engine described above, the shuttle assemblies, e.g., 84 are confined to a rectilinear path by the cylinders 16, 18, 20, 22 and the pistons 23, 24, 25, 26 rather than by an independent guide acting upon the shuttles proximate the yoke portion of the shuttle assembly. A guide, could be employed to further insure rectilinear motion of the shuttles and relieve the pistons and cylinders from side loading forces. It should be understood that while a four cylinder engine is depicted in the present application, any number of cylinders could be employed, such as two, six or eight cylinder configurations.

FIG. 2 shows a shuttle assembly 84 having two A-rods 70, 72 installed over a crankpin 58 of crankshaft 40. A conjugate driver 86 formed by joining lobed portion 62 and cap portion 66 is positioned on the crankpin 58. The undulations or lobes 88 of the conjugate driver 86 mesh with the mating undulations or lobes 90 defining a trackable profile of a corresponding conjugate bearing 74. A second conjugate driver 92 having lobed portion 64 and cap portion 68 (not visible in this view) is mounted on the same crankpin 58 and oriented such that the lobes 94 thereof mesh with the lobes 96 of conjugate bearing 76. The lobes 94 and conjugate bearings 76 are shown in dotted lines to indicate that they would be obscured from view by strengthening rib 98. It should be noted that the present invention is not intended to be directed to traditional involute gearing with tip/root clearance. FIGS. 8A–8D depict concentric, tri-lobed, conjugate drivers 286 and 292 and mating, conjugate bearings 274, 276 which have a pitch line inclined from the perpendicular of the direction of reciprocating motion. Numerous other configurations for the conjugate drivers and the conjugate bearings may be selected, as described at length in U.S. Pat. No. 5,259,256, which is incorporated herein by reference.

Figure 3:
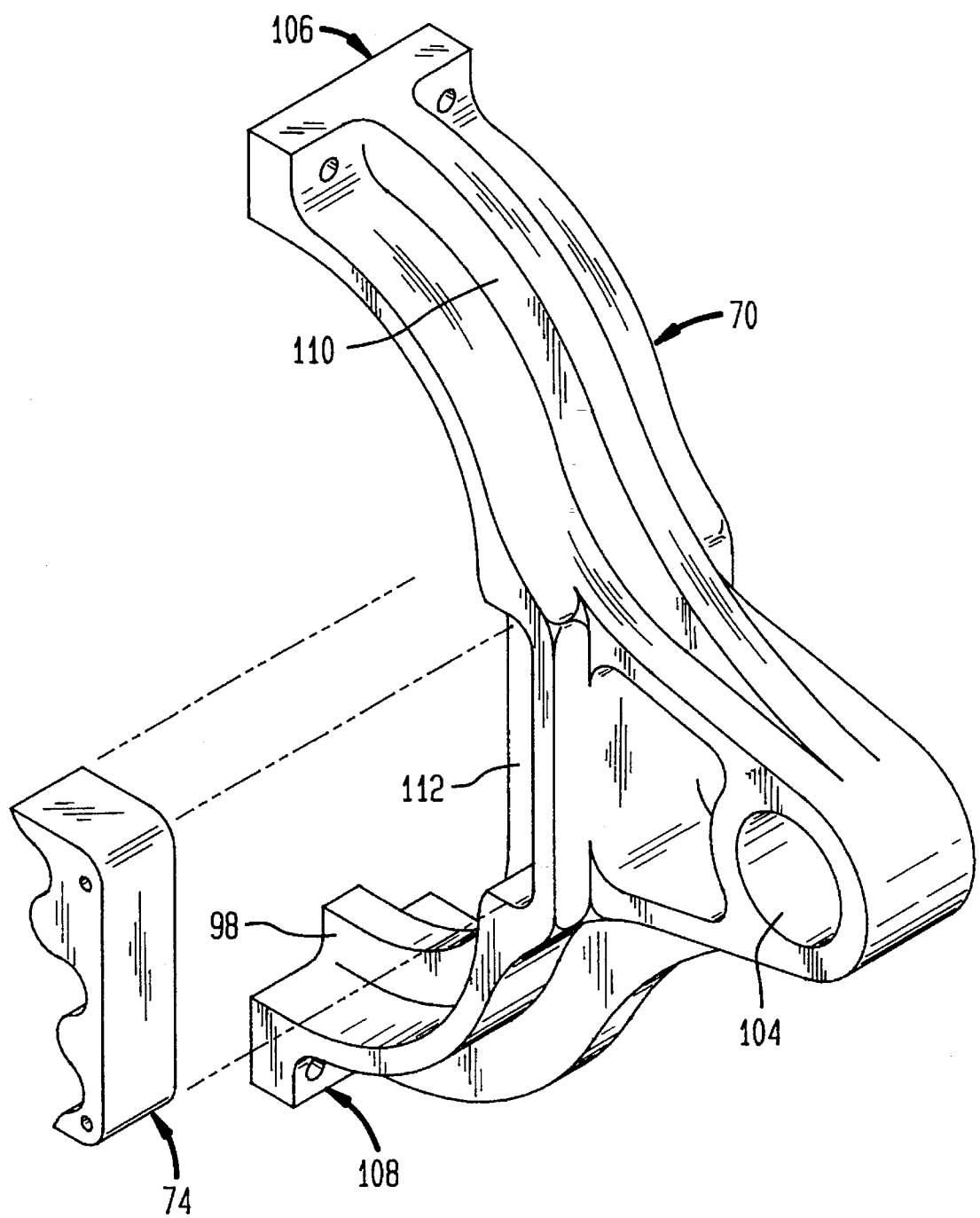
FIG. 3 is an enlarged exploded perspective view of an A-rod and conjugate bearing "rack" constituting one-half of the A-rod assembly depicted in FIG. 2.

FIG. 3 shows an A-rod 70 and associated conjugate bearing 74 in greater detail. As can be seen, there is some similarity to a standard connecting rod shape, in that there is a converging end which is penetrated by a bore 104 for accommodating a wrist pin and two diverging legs 106, 108 which are connected to the legs of another A-rod to form a shuttle assembly. The A-rod 70 may be provided with exterior strengthening ribs 110 and interior ribs 98 to provide tortional rigidity. The A-rod 70 has a recess 112 for accommodating the conjugate bearing 74 therein. A pair of through bolts or other equivalent conventional means retains the rack 74 in association with the A-rod 70.

Figure 4A:
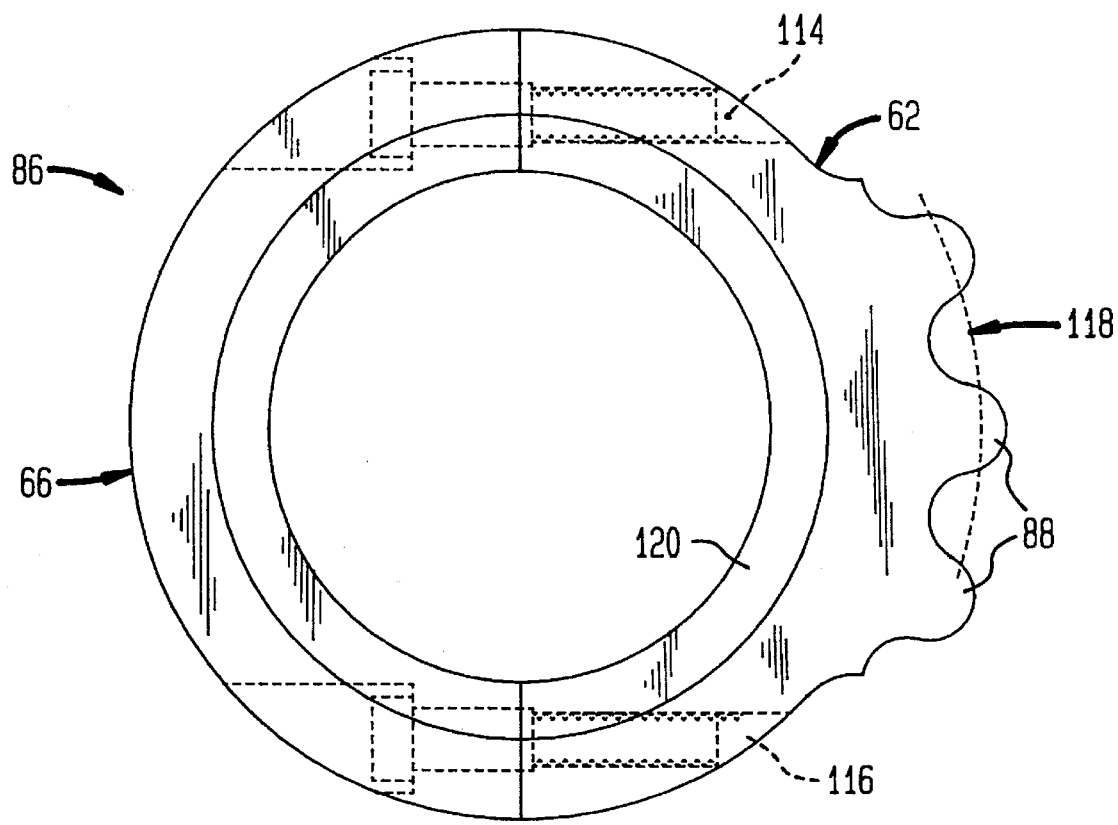
FIG. 4A is an enlarged elevational view of a conjugate driver "sector" as depicted in FIG. 1.
Figure 4B:
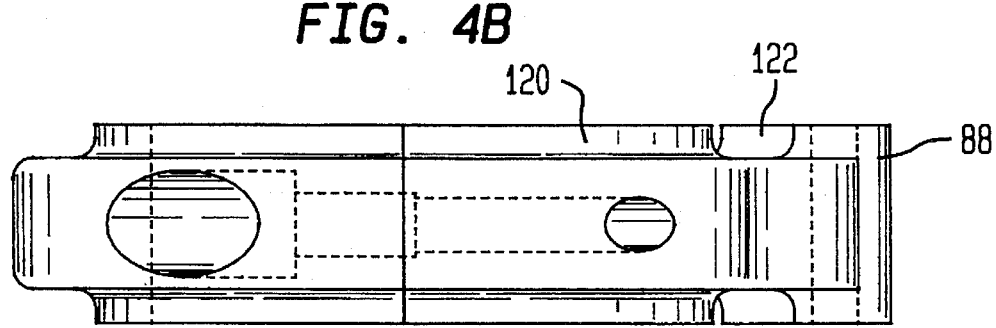
FIG. 4B is a side view of the conjugate driver shown in FIG. 4A.

FIG. 4A shows a conjugate driver 86 of FIGS. 1B and 2 enlarged. The driver 44 is centrally split into lobed portion 62 and cap portion 66 to allow tight fitting and removal from a suitable crankpin. In this Figure, the lobed portion 62 has a pair of threaded apertures 114, 116 for receiving bolts passing through the cap portion 66. As before, the lobes 88 of the lobed portion 62 are three in number. The average pitch line 118 (dotted) of the conjugate driver 86 is concentric with the crankpin upon which it is installed. An annular bearing prominence 120 facilitates adjacent conjugate drivers to counter-rotate relative to one another in sliding contact when pairs are installed on a single crankpin. FIG. 4b shows a relief groove 122 between prominence 120 and lobes 88 which permits lubricating oil to flow therethrough.

FIG. 5 illustrates a pair of conjugate drivers 86, 92 installed on a crankpin (shown in dotted lines) of crankshaft 40. The conjugate drivers 86, 92 are rotatable through 360 degrees about the crankpin and are rotatable independently of each other. In the position depicted, the lobes 88, 94 point in opposite directions ready to engage conjugate bearings disposed on either side of the yoke portion of a shuttle assembly.

Figure 6B:
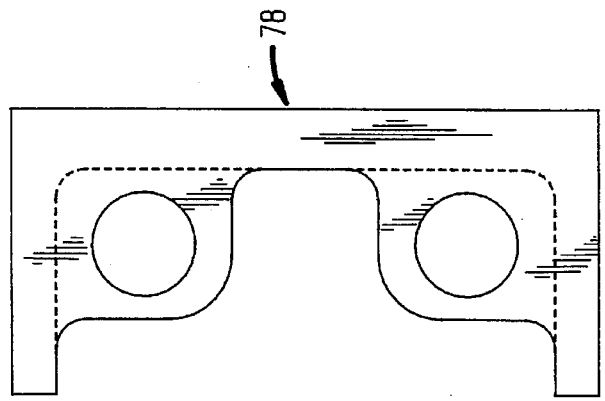
FIG. 6B is a side view in elevation of the gusset box depicted in FIG. 6A.
Figure 6A:
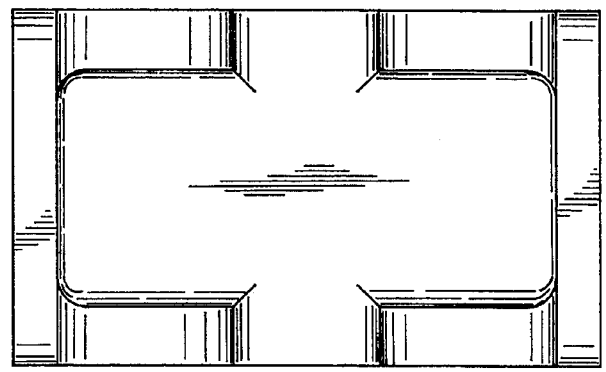
FIG. 6A is an enlarged plan view of an A-rod assembly gusset box as shown in FIG. 2.
Figure 6C:
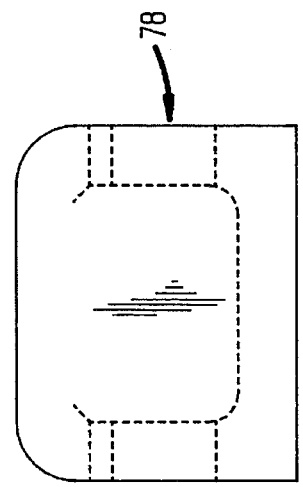
FIG. 6C is an end view in elevation of the gusset box shown in FIGS. 6A and 6B.

FIG. 6A–6C depict the gusset box 78 shown in FIG. 1. The gusset box 78 is preferably a steel forging and provides support to and stiffens the connection of A-rod legs, e.g., 106 to form a rigid shuttle assembly. As mentioned above, the shuttle can be made as a single unit, such as an aluminum casting.

Figure 7:
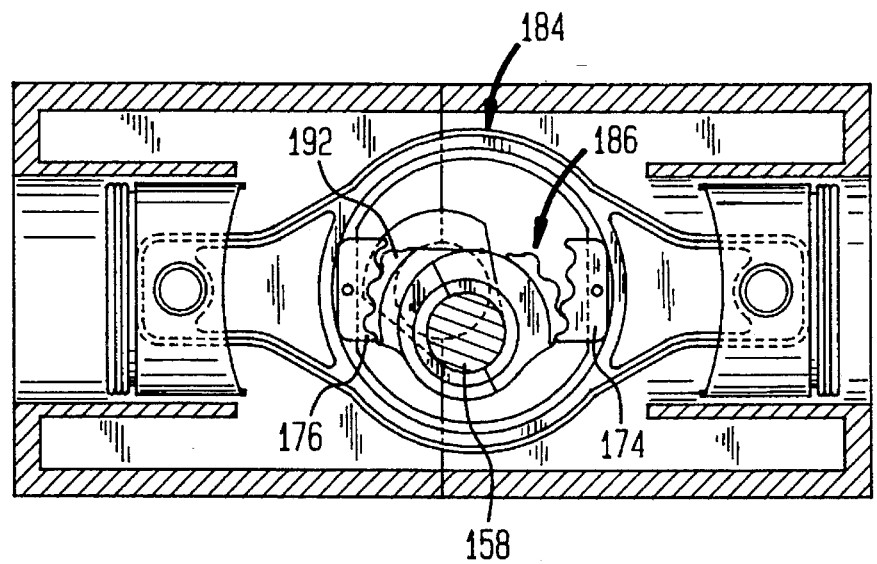
FIG. 7 is an enlarged view of a crankshaft and yoke assembly in accordance with a second exemplary embodiment of the present invention.

FIG. 7 shows an alternative embodiment of the present invention wherein the shuttle assembly 184, rather than being composed of a pair of A-rods, is a unitary "O" rod mono-lithically casted or forged. In the remaining description of the figures, the following reference numeral convention will be followed. Corresponding elements shall be given the same reference number incremented by one hundred. Corresponding elements have the same structure and function unless otherwise noted or illustrated. Referring again to FIG. 7, it can be seen that the conjugate drivers 186, 192 have an average pitch line which is eccentric to the crankpin 158. Conjugate bearings 174, 176 have an average pitch line which is perpendicular to the line of linear reciprocating motion of the shuttle 184. This configuration illustrates one of many driver/bearing combinations which can be utilized to achieve desired cycle dynamics thereby realizing enhanced operation over the slider crank engine as more fully discussed below.

Figure 8A:
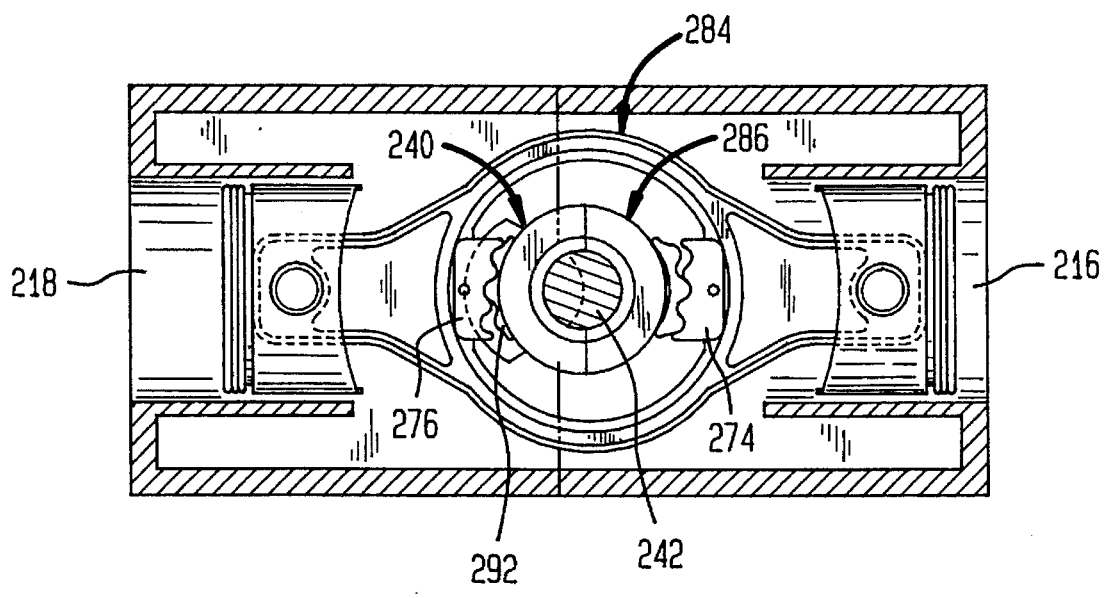
FIGS. 8A–8D are a series of schematic elevational views of a third embodiment of the present invention as it moves through a portion of its range of motion.
Figure 8B:
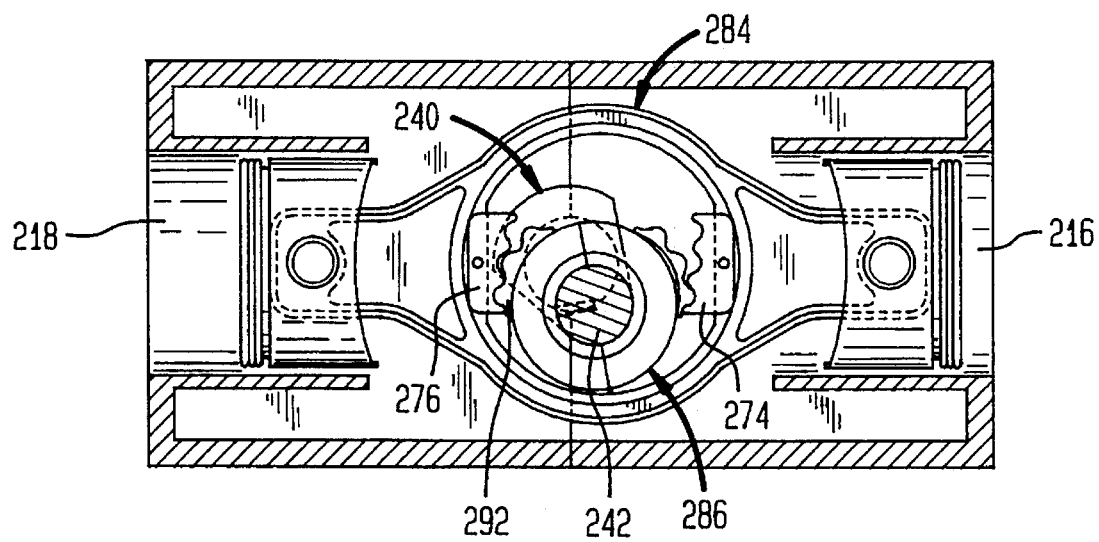
Figure 8C:
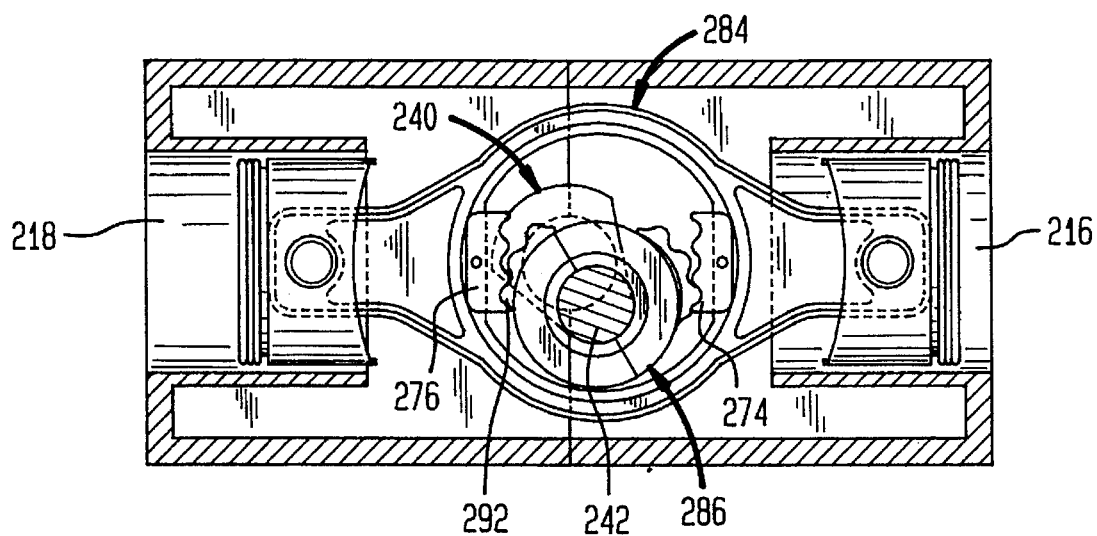
Figure 8D:
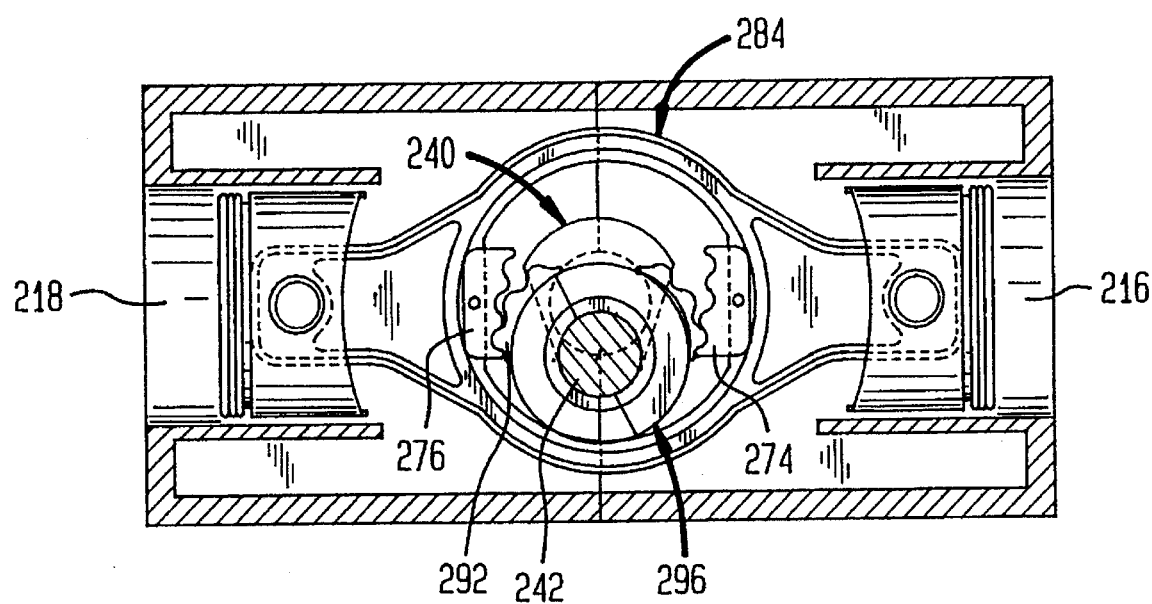

FIGS. 8A–8D show a third exemplary embodiment of the present invention having concentric conjugate drivers 286, 292 and conjugate bearings 274, 276 having a positive, left to right slope at four different positions during the travel of the crankshaft 240 through 90 degrees of rotation. FIG. 8A shows the crankpin 242 at 0 degrees relative to the axis of the cylinder 216. FIG. 8B shows the crankpin 242 at 30 degrees. In FIG. 8C, the crankpin 242 is at 60 degrees; and, in FIG. 8D, the crankpin 242 is at 90 degrees.

As the crankshaft 240 rotates, the crankpin 242 moves up and down within the yoke opening of the shuttle 284 relative to the axis of the cylinders 216, 218 (i.e., in a vertical direction). The horizontal component of crankpin 242 motion is translated into the rectilinear motion of the shuttle 284. The crankpin 242 is captured within the conjugate drivers 286, 292 and is therefore prevented from contacting the interior periphery of the shuttle 284. The conjugate drivers 286, 292 pivot about the crankpin 242 as the crankshaft 240 rotates, the conjugate bearings 274, 276 being immovable in the direction perpendicular to the linear path of the shuttle 284. The conjugate drivers 286, 292 pivot in opposite directions and can therefore be said to be counter-rotating. The crankpin 242, assuming that it has an axial offset "r" from the crankshaft 240, causes a reciprocating linear motion of the shuttle of magnitude 2 r, ranging from −r to +r.

Figure 9:
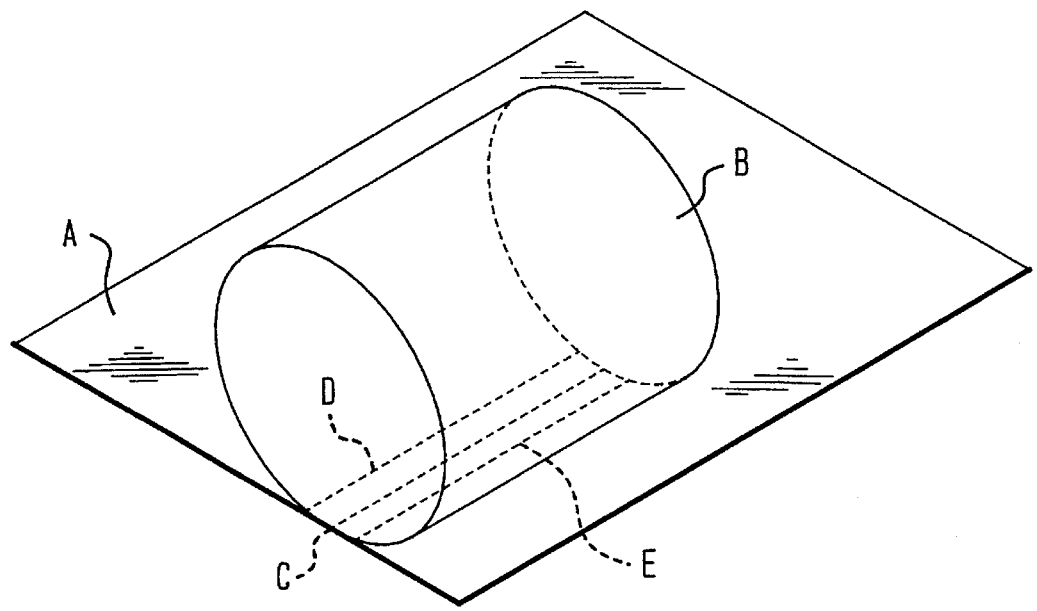
FIG. 9 is a perspective view of a cylindrical roller contacting a flat surface.

The above-described conjugate drive apparatus provides several functional advantages over a roller bearing riding upon a flat surface or traditional gear shapes that otherwise might be used to intermediate between the crank and shuttle. For example, a roller bearing or wheel riding upon a flat surface could be depicted as shown in FIG. 9. In FIG. 9, the flat bearing surface A is tangent to the circumference of the wheel or roller B. As such, there is a high degree of divergence of the two surfaces with greater divergence associated with smaller circumference. If the wheel and flat bearing surface were non-deformable and/or there is no pressure urging them together, then there would be line contact between the wheel and bearing surface, as depicted by dotted line C. If the wheel is urged toward the bearing surface, and the materials exhibit normal elastic behavior, the elasticity of the materials results in a deformation in both such that there is a flattening out of the wheel and a depression of the flat surface resulting in an increase in contact area as represented by the area between dotted lines D and E. In the case of steel or other hard metals, the degree of deformation will be microscopic and will depend upon the modulus of elasticity of the material and the compressive force applied.

Figure 10:
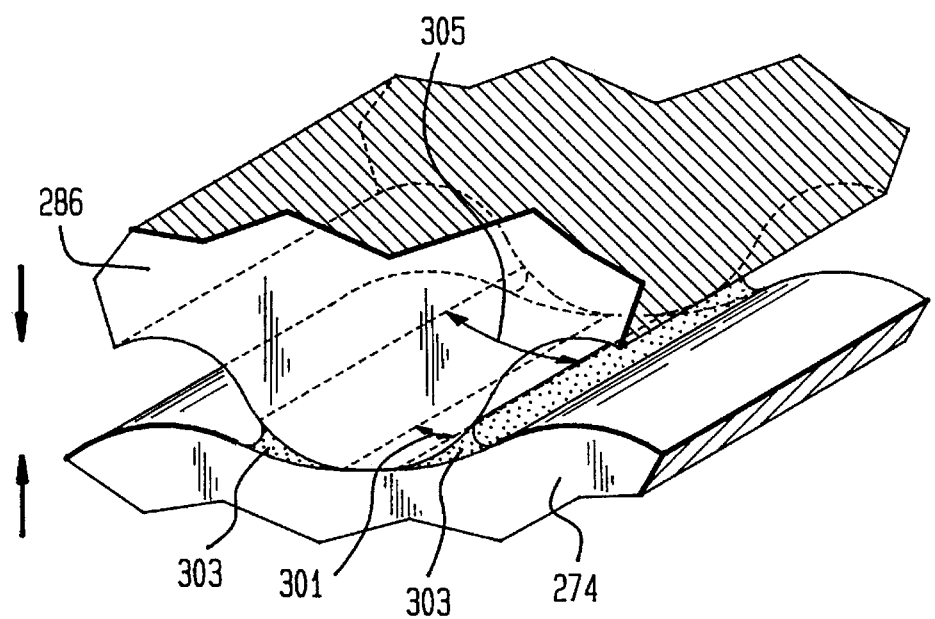
FIG. 10 is an enlarged segment of the conjugate drive of the present invention showing contact between a conjugate driver and a bearing conjugate.

It can be observed in FIG. 10 that impinging curved surfaces sharing a similar average radius and direction of curvature generate a relatively wide band of effective contact under loading forces. It should be understood that in the unloaded condition, similar but different curves will touch at only along a single line. For example, if a cylinder is placed within a slightly larger cylinder, there can only be line contact between the cylinders at any one time (assuming no deformation). Deforming compressive forces alter this relationship significantly. FIG. 10 shows a segment of a conjugate driver, e.g., 286 impinging upon a mating portion of its corresponding conjugate bearing 274. The junction is under compressive force, as indicated by the converging arrows to the left of the drawing. Even though the curves describing the respective profiles of the conjugate driver 286 and the conjugate bearing 274 differ, they are similar. Thus, under compression, the deformation of the driver and the bearing results in an increase of contact area represented by the band spanned by the double-headed arrow 301. This area could be denominated the effective dry contact area under compression. The greater effective contact area experienced due to similar curved surfaces under load is a consequence of the fact that there is less distance between similarly curved surfaces than between, e.g., a curve and its tangent line. For a given deformation displacement due to metal elasticity, a larger portion of approximately parallel surfaces will come into contact than for clearly non-parallel surfaces.

Curved surfaces which tend toward parallelism are also more efficacious for establishing and maintaining a hydrodynamic wedge or film of lubricating oil between the mating surfaces. As illustrated in FIG. 10, hydrodynamic wedges of lubricant 303 not only prevent dry contact between the mating elements but also function to transfer compressive force between the converging surfaces, thereby distributing the compressive force over a greater area and increasing the effective contact area. This hydrodynamic effective contact area is illustrated by double-headed arrow 305. Both the dry effective contact area and the hydrodynamic effective contact area will vary with the compressive force and the speed of surface conjugation.

The present invention using a conjugate drive exhibits mating surfaces which are more closely parallel than a tangent line to a circle. Stated another way, the average radius over a number of degrees of the "tooth" projection of the conjugate driver and the average radius over the same number of degrees of the mating "tooth depression" in the bearing conjugate differ only slightly. In contrast, the radius of a wheel differs by an infinite amount over the radius of a straight line which is a radius of infinite length. The practical consequence of this approximate parallelism, which exists at least over short distances, is that the deformations associated with a given load and material composition result in a greatly increased effective contact area over that of a wheel on a flat surface. One might also note that wheels, with their limited contact, concentrate the deformation forces along a narrow band of contact which results in metal fatigue and/or deformation beyond the elastic limit resulting in permanent deformation at positions of high compression (e.g., flattening of the wheel or bellying of the flat surface). In addition, at points in the cycle where there is light or no load on the wheel/surface interface, there could be a loss of contact or slippage such that the wheel would fail to track over the bearing surface.

If conventional gearing were applied at the conjugate drive/bearing conjugate interface it would partially solve the problem of a lack of tracking and slippage associated with wheels or rollers by exhibiting the gross mechanical interaction of interdigitation, but gears present another set of problems. Conventional gearing typically utilizes a first rotatable member rotating about a fixed axis and having a plurality of teeth. The teeth of the first rotatable member interdigitate with the teeth of either a second rotatable member or a linearly moving rack. The teeth of the first (driver) member "paddle" against the teeth of the second (driven) member such that force is delivered by the faces of the driver gear teeth to the faces of the driven gear teeth in a direction tangent to the pitch line of the driver gear. A clearance is provided between each gear tooth tip of the first gear and the corresponding root fillet of the mating gear. There is no contact between tip and root.

In contrast, the motion conversion apparatus of the present invention is intended to transmit force between a linearly reciprocating shuttle and the crankpin of a rotating crankshaft. This force is transmitted through the trackable profile interface of the conjugate driver and conjugate bearing. The transmission of force in the present invention has significant components normal to the driver/bearing interface. Thus, the conjugate profiles are urged into compression against one another. "Paddling" type interdigitating gear teeth are not a suitable alternative for bearing compressive loads, owing, at least partially, to the clearance gap present at the tip/root interface. If interdigitating gear teeth are subjected to the forces encountered by the conjugated profiles of the present invention's motion translator, the interdigitating teeth of each gear would be urged toward the tip/root gap of the other gear, thereby causing a wedging action of the interdigitating teeth. This successive wedging action creates tremendous friction and an unacceptable amount of wear and could not be used in a workable device. Conventional gearing has inherent clearance and, thus, loss of contact and slippage. As described, the tip/root gap of conventional gearing does not provide an adequate load bearing support surface and indeed represents a "loss of contact". In this respect, conventional gearing exhibits an intermittent contact surface in contrast to the continuous contact surface of the conjugate drive (due to the intermittent loss of contact between tip and root).

As can be appreciated from the above description of FIGS. 9 and 10, the effective area of contact between the conjugate driver and the conjugate bearing of the present invention is substantially increased over the line contact of a roller bearing (or wheel) on a tangent surface. This results in the potential of the present invention to endure greater typical primary normal loading forces, thereby increasing its power density. The arrangement depicted herein can support greater loading forces directed along the line perpendicular to the pitch line than gear shapes which are intended to transfer torsional forces acting parallel to the pitch line. The trackable profiles of the conjugate drivers 286, 292 and bearings conjugates 274, 276 constitute the actual pitch lines and are therefore tangible rather than being an intangible, abstract line, as in conventional gear teeth. The trackable profiles can therefore be denominated "pitch surfaces".

After all the various embodiments of the conjugate drive as disclosed herein and as disclosed in the patents and applications incorporated herein by reference are considered, it should be apparent that the conjugate drivers and conjugate bearings 286, 292 and 274, 276 can be configured in a variety of ways. In each instance, however, it is an objective to prevent scuffing, to provide an adequate load bearing support surface and improved lubrication. Scuffing of the surfaces is avoided when the drivers 286, 292 track along the profiles of the bearings 274, 276 without loss of contact or slippage throughout the range of motion of the device. Bearings conjugate 274, 276 thus constitute trackable profiles with respect to the conjugate drivers 286, 292. In addition, one could observe that the total circumferential length of the trackable profile of each of the bearings 274, 276 equals the total circumferential length of the corresponding driver 286, 292 which tracks over it.

Figure 11:
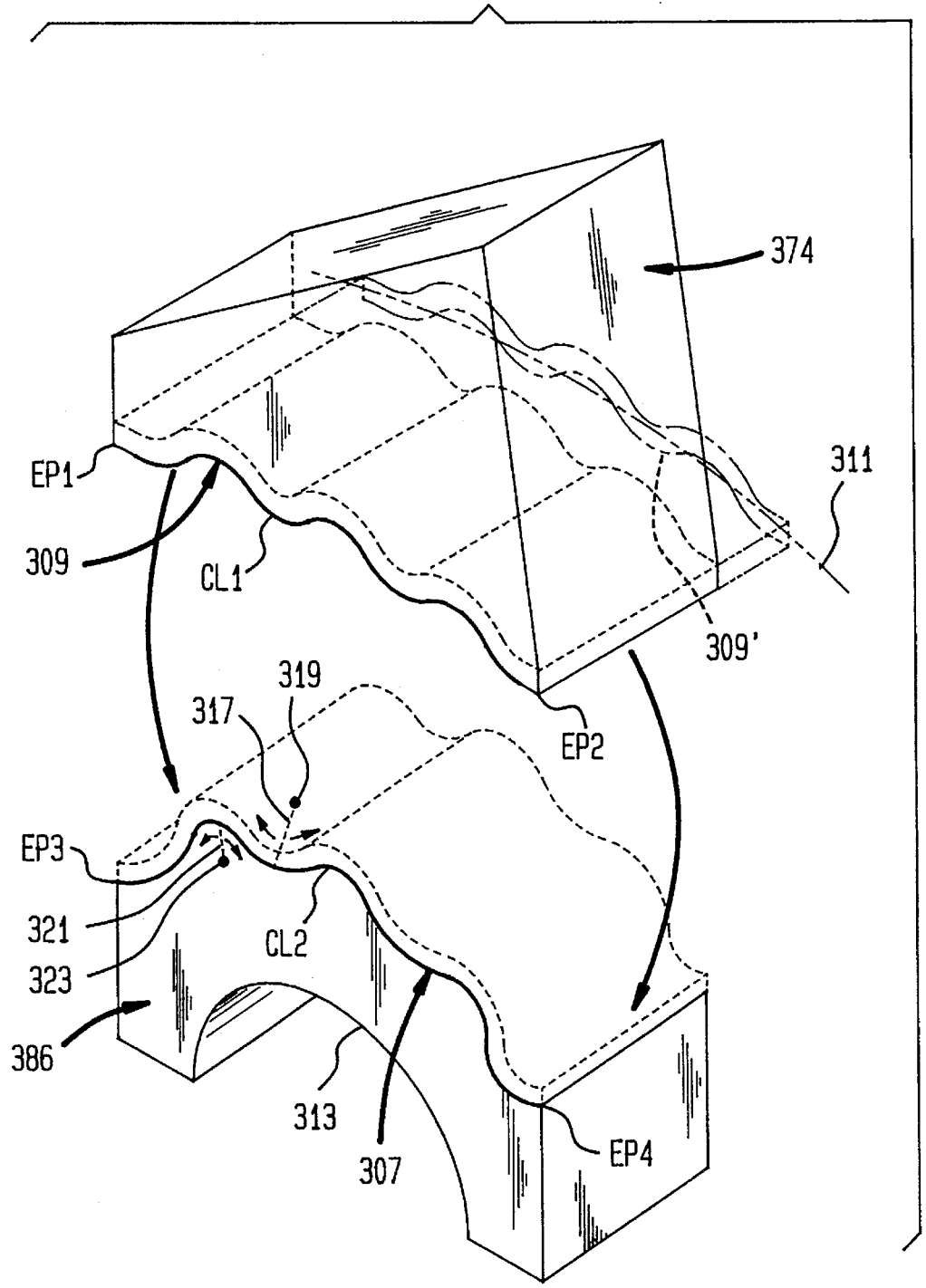
FIG. 11 is an enlarged view of a conjugate drive and mating bearing conjugate illustrating diagrammatically the relationship between the respective mating surfaces.

FIG. 11 illustrates an embodiment of the conjugate drive of the present invention and depicts the relationship between the conjugate driver outer surface 307 (surface extending from boldface line CL2) and the outer surface 309 of the bearing conjugate 374 (surface extending from boldface line CL1). Given a particular undulation pattern on either member, a mating trackable profile may be generated on the other. The undulation pattern of the bearing conjugate 374, for example, could be described as a continuous series of displacements above, on and below a reference surface. An end-on cross-sectional view of this surface is depicted by dotted line 309' which is a projection of the surface contour or profile of the bearing conjugate outer surface 309. Dotted line 309' can be defined as a series of displacements above, on and below a reference line 311. In FIG. 11, the undulation pattern of the bearing conjugate surface 309 is translated or superimposed upon the generally arcuate shape of the conjugate driver 386 to give the resultant surface contour 307. The undulations in the conjugate driver 386 can be defined as a series of displacements above, on (zero displacement) and below a reference surface associated with the conjugate driver, (not shown for simplicity of illustration), e.g., a cylinder section parallel to the conjugate driver crank bearing surface 313. The surface contour 309 has a circumferential length CL1, as measured between end points EP1 and EP2. The circumferential length CL2 of the conjugate driver 386 surface 307 is measured between end points EP3 and EP4. CL1 is of equal length to CL2.

A physical analogy for this conjugation relationship is that the undulating pattern 309 of the conjugate bearing 374 is "bent over" the arcuate shape of the conjugate driver 386. It is not necessary that the conjugate driver's arcuate shape (i.e., its reference surface) be a simple cylinder, rather, it may embody a compound and/or complex curvature. Similarly, the reference line 311 may be straight, a simple curve or a compound, complex curve. The shapes of the respective reference surfaces are selected to control the motion of the crankpin 242 (see FIG. 8D) relative to the shuttle 284. It should be observed that in translating the undulations from the conjugate bearing 374 to the conjugate driver 386, the exterior radii, e.g., 317, from center 319 associated with the driver profile, (outer surface 307) are lengthened while the interior radii, e.g., 321 from center 323, are shortened. With respect to certain profile shapes, such as, a compound, complex curved surface, it is a simplification to associate a significant portion of the profile shape to a few radii. In that particular instance, the resulting profile curvature could be described as being composed of a chain of small arcs swept by numerous radii having distinct centers on either side of the profile.

Despite the change in radii, the overall circumferential length (which is represented by the boldfaced curvilinear line CL1, as measured between endpoint EP1 and endpoint EP2) of the trackable profile of the conjugate bearing 374 remains the same after translation onto the conjugate driver 386. The overall circumferential length which is represented by the boldfaced curvilinear line CL2, as measured between end point EP3 and end point EP4, is equal to CL1. Stated differently, if both surfaces were straightened, they would be the same length (i.e., CL1=CL2). Owing to this relationship, the surface of the conjugate driver 386 can track line-by-line over the surface of the bearing conjugate 374 without slippage and without clearance. With respect to terms such as "equal" and "no clearance", the inventor herein recognizes that these conditions are achievable in the real world only to the level of precision inherent in machine tools. However, objectives of "equality", "no clearance" and "no scuffing" are clearly distinguishable, both in fact and intent, from clearances, such as the root/tip clearance, that are designed in or provided for in conventional gearing.

Figure 12:
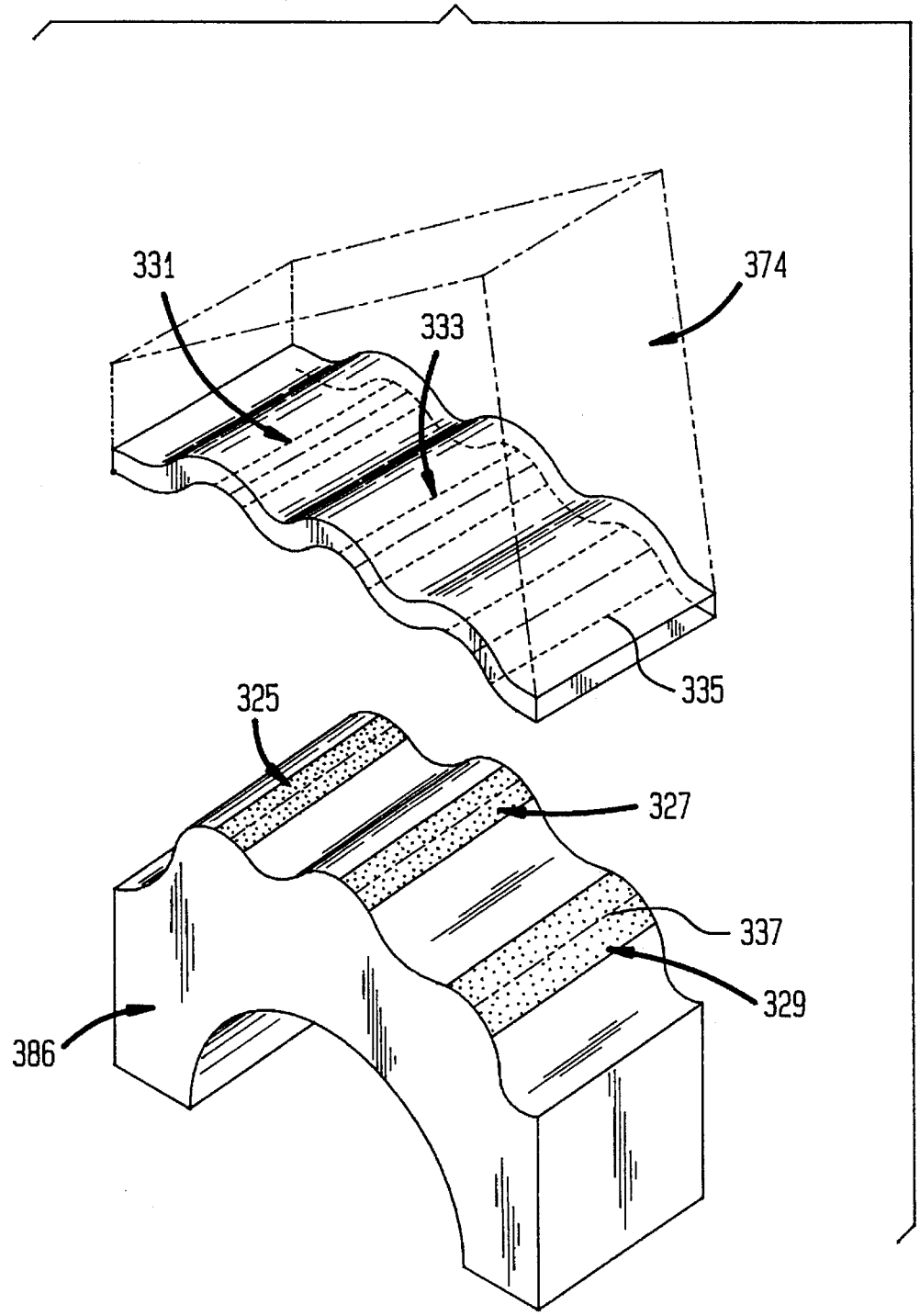
FIG. 12 is an enlarged view of the conjugate drive and mating bearing conjugate of FIG. 11 showing selected sequential contact areas.

FIG. 12 illustrates the increased dynamic effective contact area associated with the similar but unique curved surfaces of the mating conjugate driver 386 and bearing conjugate 374 (partially in phantom) under compression. The contact surfaces associated with three distinct positions occurring at distinct periods of time are illustrated. It should be understood that the three contact areas shown would not exist simultaneously, as shall be further explained below. In addition, FIG. 12 depicts the tracking relationship between the driver 386 and bearing 374 (no slippage, clearance or scuffing) More specifically, in the present invention with conjugate drive, the correlation of line-for-line contact between the bearing conjugate 374 and the conjugate driver 386 is, under working conditions, a correlation of bands or strips of contact, i.e., when the motion translator is operating and the interface is subjected to compressive loading forces. In addition, the effective contact area is increased by the presence of a lubricant. FIG. 12 shows a selected group of contact areas 325, 327, and 329 on the driver 386 associated with discrete points in time at discrete phases of a full range of travel of the conjugate drive under one set of operating conditions, e.g., engine under no load and running at 1000 RPMs. These contact areas on the driver 386 correspond with contact areas 331, 333 and 335 on the bearing. As illustrated, the effective surface contact areas will vary depending upon variations in loading forces experienced at different degrees in the cycle. During times of extremely high loading or overload, the dry contact area may be larger. When lightly loaded, e.g., at low RPM, the effective dry surface contact approaches line contact, but a more substantial effective contact area is maintained by the hydrodynamic effect of the lubricant. To illustrate the potential variations in the width of the effective contact area due to loading, area 329 is shown as being larger than area 325. To depict the distinction between the effective contact area, e.g., 329 and the line contact associated with dry unloaded operation, a dotted line 337 is drawn through each effective contact area shown. On account of its influence on the effective contact area, the lubricant may be denominated a "contact medium" or "constant contact medium". In operation, the effective surface contact area migrates along the interface between the driver 386 and the bearing 374 as the driver tracks over the bearing. This migration is uninterrupted due to the constant contact between the conjugated members (386, 374). One could also express this relationship by noting that a continuum of contact lines arranged along the entire circumferential length of the respective profiles of the conjugate driver and conjugate bearing may be said to exist. Further, the respective contact lines serially contact a corresponding contact line on the mating profile as the conjugate drive progresses through its range of motion. In this manner, the entire surface area of each of the profiles contribute to load transmission and may be said to be load transmitting surfaces. The contact areas shown in FIG. 12 represent the contact areas that would be present at three different times.

Figure 13:
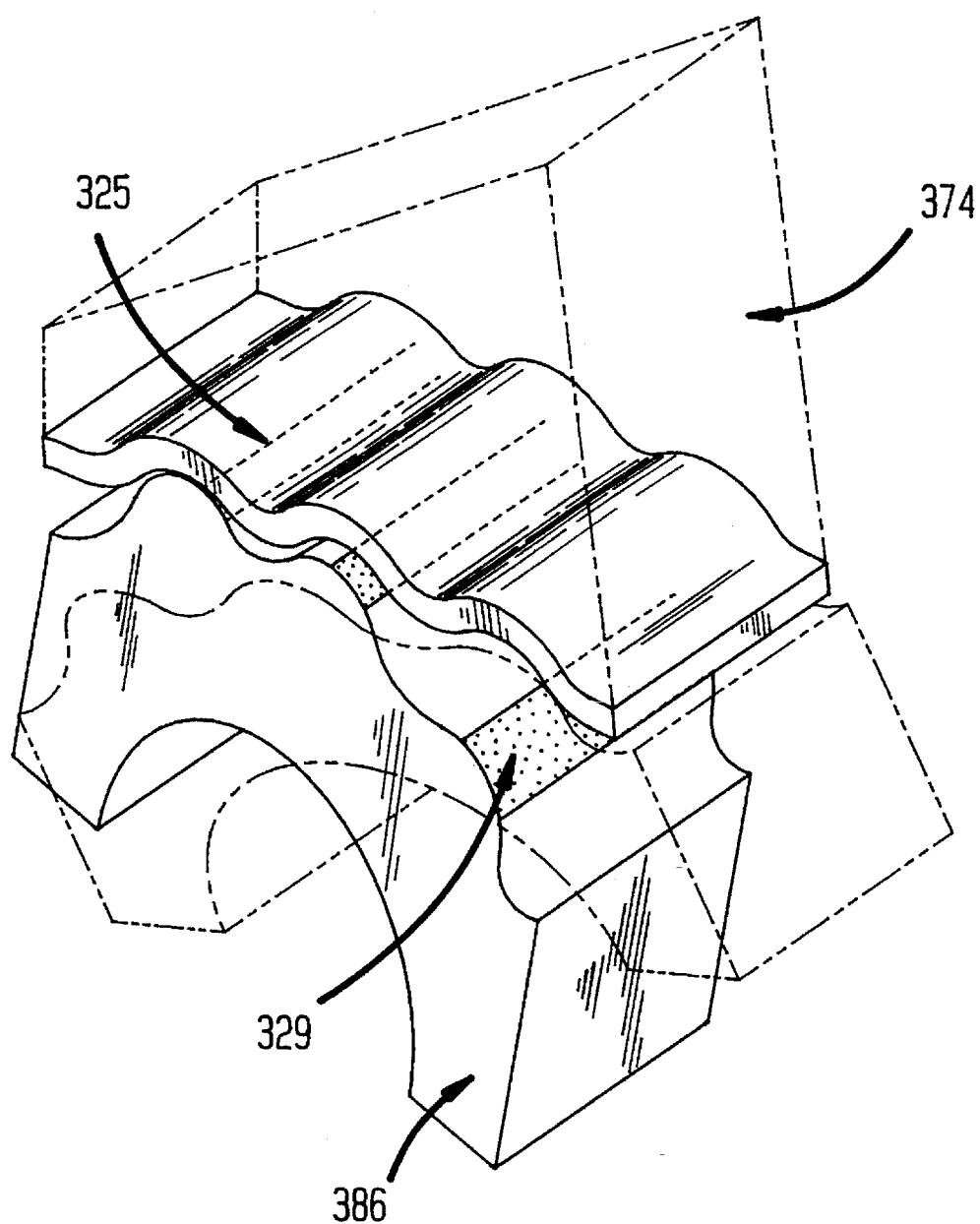
FIG. 13 is and enlarged view of the conjugate driver and mating bearing conjugate of FIG. 21 in two positions of conjugate motion.

FIG. 13 shows the rolling conjugated interaction of the bearing conjugate 374 and the conjugate driver 386. In a first position (indicated by solid lines) the driver 386 contacts the bearing conjugate 374 at contact area 325. When the driver has moved into a second position (indicated by dotted lines) the area 329 on the driver 386 will be in contact with the surface of the conjugate profile of the bearing conjugate 374. The correspondence of contact areas is constant for each itteration of the conjugate drive's motion. That is, for each cycle, there is a repetition of contact area correspondence.

As described in co-pending application Ser. No. 08/149, 064, entitled Lubrication System for a Conjugate Drive Mechanism, filed Nov. 8, 1993, the maintenance of a hydrodynamic film of lubricant has notable beneficial effects and is readily achieved in the present invention with conjugate drive. If a quantum of lubricant is injected between the driver and the bearing before the area of contact and preferably at a point of low loading, it will be pushed along in front of the mating interface i.e., the migrating contact area, through the range of travel.

It may be noted that the conjugate drive of the present invention has certain attributes of a wheel, in that it rolls smoothly over a support surface in line-for-line contact, without clearance gaps. It also has attributes of gears, in that the driver and the bearing exhibit a repetitive tracking mechanical interaction which prevents slippage. Unlike a gear system, there is no tip-to-root clearance or a multiple set of sequentially interrupted contact surfaces, Instead, the contact is continuous. The conjugate drive of the present invention also exhibits an increased contact area over either the wheel or the gear. One should further note that the tracking profiles of the conjugate drivers 286, 292 act as self-aligning components as they interface with their respective conjugate bearings 274, 276.

The conjugate bearings 274, 276 and the conjugate drivers 286, 292 may be formed of hardened steel or other materials as commonly used to form gears and may include surface treatments to reduce wear, friction and production costs (e.g., electroplating, nitriding, spray dispersement and, in general, any known applicable metallurgical or coating process). The weight of the bearings 274, 276 could be reduced by forming them as a multi-material matrix of aluminum and steel or other metal or non-metal matter. The crank bearing surfaces of the conjugate drivers 286, 292 may be similarly enhanced by surface treatment or bonding with a friction-reducing bearing material.

The cycle dynamics of the present invention as shown in FIGS. 8A–8D are altered from that of the slider crank engine due to the inclined pitch line of conjugate bearings 274, 276. By inclining the pitch line of the conjugate bearings from an orientation perpendicular to the cylinder axis, a cycle having, e.g., a 15 degree offset from a slider crank cycle can be obtained. In that instance, the following correspondence of piston position to crank angle would exist as compared to a slider crank engine.

| PRESENT INVENTION crank angle (degrees) | SLIDER CRANK crank angle for same piston position |
|---|---|
| INTAKE & COMBUSTION | |
| 15 | 0 |
| 54 | 44 |
| 76 | 64 |
| 95 | 82 |
| 116 | 100 |
| 142 | 124 |
| 195 | 180 |
| EXHAUST & COMPRESSION | |
| 195 | 180 |
| 234 | 236 |
| 256 | 260 |
| 275 | 278 |
| 296 | 296 |
| 322 | 316 |
| 15 | 360 |

Figure 14:
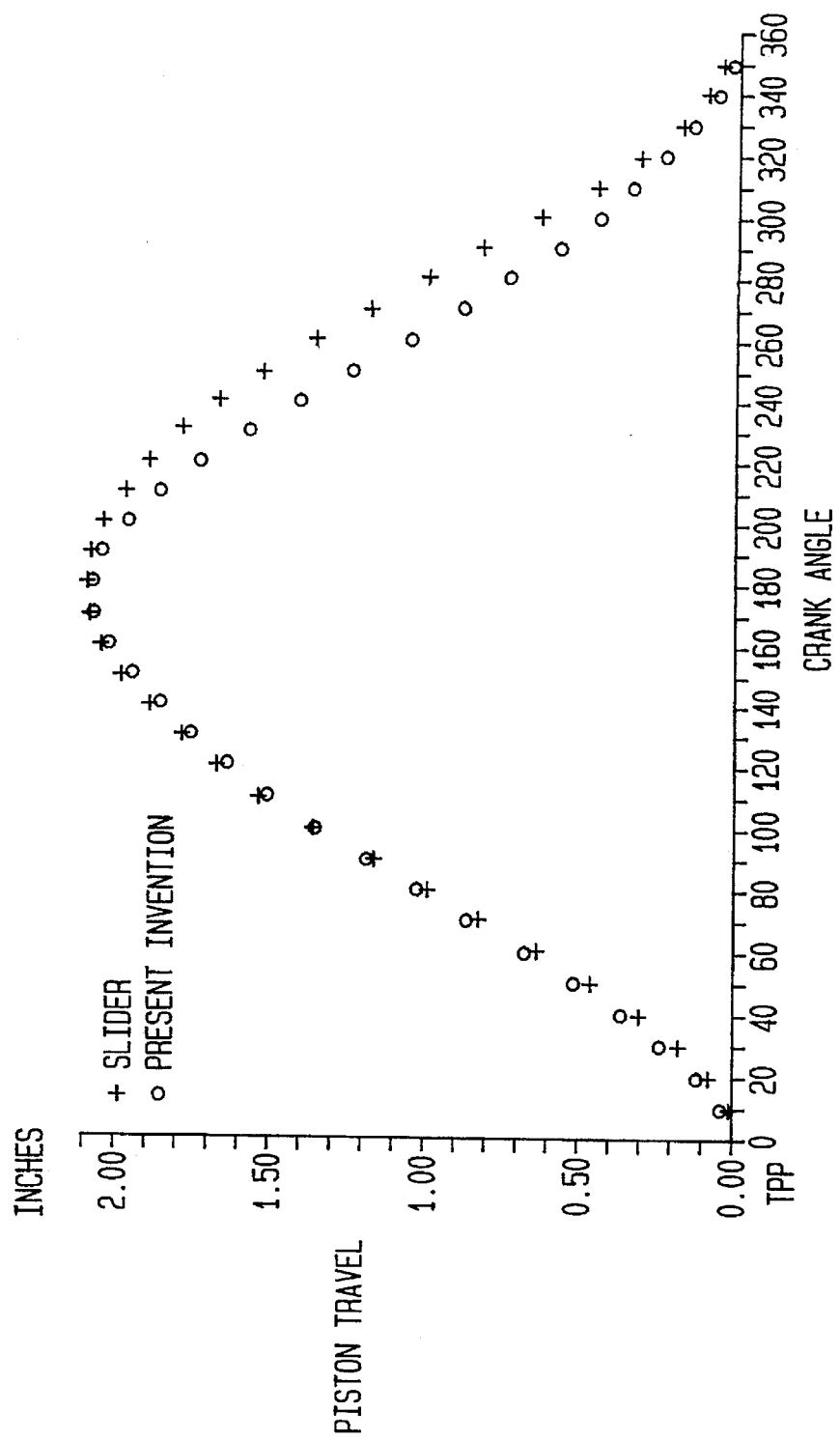
FIG. 14 is a graph of piston position (travel) vs. crank angle for a fourth exemplary embodiment of the present invention, as compared to a slider crank engine with an equivalent stroke.

Given this particular example of the present invention with a 15 degree offset, the effect on cycle dynamics and engine operation will now be considered. FIG. 14 is a graph of piston position as a function of crankshaft degrees after top piston position (TPP), being 0 degrees for the crank slider and 15 degrees for the embodiment of the present invention under consideration. When the crankshaft has travelled 180 degrees after TPP, for the present invention, the crankshaft will be at 195 degrees and the piston will be at bottom piston position (BPP). Note that TPP would occur at 0 degrees for the crank slider. As illustrated in FIG. 14, the relationship between piston position and crank angle is different at most points throughout the cycle from TPP to BPP and back to TPP for the present invention as compared to the slider crank. This condition causes a corresponding change in piston velocity and acceleration at any particular point in the cycle.

Figure 15:
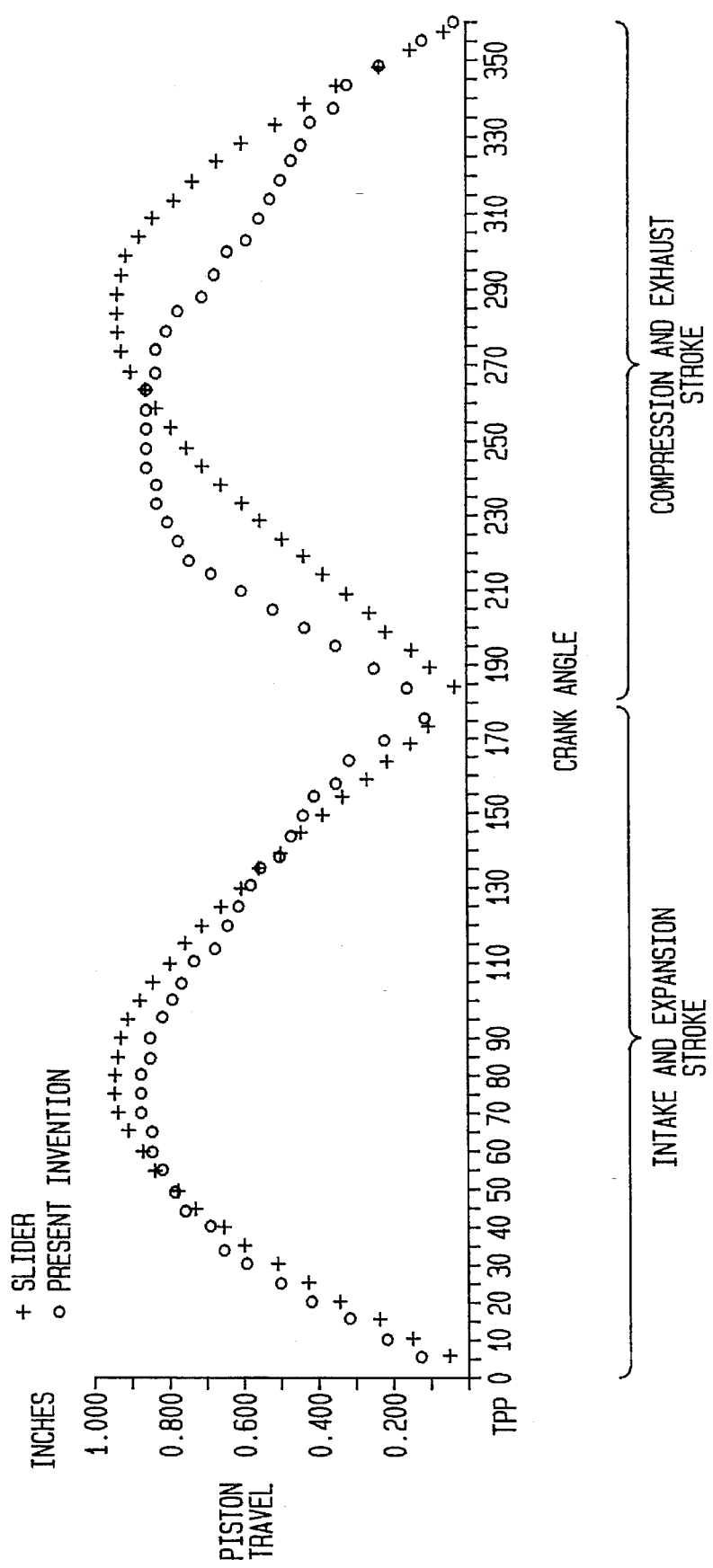
FIG. 15 is a graph of piston acceleration/deceleration during the intake/expansion and compression/exhaust stokes, respectively, comparing the fourth exemplary embodiment of the present invention graphed in FIG. 14 and the slider crank engine graphed in FIG. 14.

FIG. 15 shows piston acceleration/deceleration for the present invention and the slider crank during the intake and combustion (expansion) strokes and during the compression and exhaust strokes. In FIG. 15 the ordinate line is a measure of distance the piston has moved from one point to the next for each 5 degree movement in crank rotation past TPP.

The differences in cycle dynamics illustrated in the foregoing graphs have an impact upon certain basic performance characteristics of the engine, such as pumping losses and volumetric efficiency. Besides the friction due to mechanical crankcase components and piston against cylinder, there is a large friction loss in reciprocating piston engines attributable to intake and exhaust throttling, that is, the energy required to draw the fuel air charge into the combustion chamber and the energy required to pump the exhaust gases out of the cylinder. These friction losses are related to volumetric inefficiency and incomplete exhaust removal which further contribute to poor engine performance. It is well known that the better an engine "breathes" the more powerful and efficient the engine is. Besides the restrictions on volumetric efficiency caused by the shape and dimensions of the manifold and valve ports, the cycle dynamics of the slider crank engine also limit volumetric efficiency. The present invention with altered cycle dynamics can achieve a higher volumetric efficiency than the slider crank by increasing piston acceleration after TDC as exhibited by FIG. 15. The greater piston acceleration after TDC establishes an increased pressure differential between that which exists in the cylinder as compared to that which exists outside the cylinder.

Numerous variations in cycle dynamics may be accomplished by changing the shape, inclination and/or concentricity of the conjugate drivers and conjugate bearings. It is possible, e.g., to dwell the piston at TPP and exert maximum pressure when the crank is in excess of 40 degrees past TDC. Conversely, it is possible to design the drivers and bearings so that top piston position occurs before the crank arm moves to zero degrees and to accelerate the piston during the degrees of rotation past TDC. This flexibility in cycle dynamics allows the engine to be tailored for different fuels.

If an offset of 15 degrees between the zero degree point and the TPP is effected as previously described, piston dwell will begin at 9 degrees and continue until 15 degrees. Because TPP occurs 15 degrees beyond the zero degree mark, the advanced crank arm of the present invention provides slightly increased volume for each additional degree of crank rotation as compared to the slider crank engine. An increased dwell at TPP also permits greater induction of fuel air mixture resulting in an increase in volumetric efficiency. An increased dwell at BPP allows more of the unburned exhaust gas to escape from the exhaust valve reducing the quantity of exhaust gas that must be pumped from the cylinder. This increase in volume per crank angle decreases the time for heat transfer from the combustion products and the cylinder and piston. For this reason, a greater portion of the combustion energy is available for useful work. With extended dwell time at TPP and BPP, slightly accelerated volume progression and the possibility of improved ignition characteristics, a more uniform, lower combustion temperature gradient is feasible. This lower temperature gradient reduces the non-equilibrium reaction of nitrogen and oxygen caused at high peak combustion temperature as well as the dissociation of $CO_2$ into CO and $O_2$. Both nitrogen oxides NOx and carbon monoxide constitute serious pollutants. In general, both NOx and CO are reduced by reducing the combustion temperature. At high temperatures, $CO_2$ disassociates to a greater extent than at low temperatures and the amount of $CO_2$ progressively decreases in the equilibrium mixture as the temperature increases. Pressure has an effect upon the equilibrium reaction $CO+½ O_2 \; CO_2$ in accordance with the principle of Le Chatelier-Braun, i.e., a system in chemical equilibrium attempts to counteract any change in pressure. Since the pressure is the sum of the partial pressures of the $CO_2$, the $O_2$ and the CO, an increased pressure favors the greater completion of reaction since the products require less volume than the reactants (1 mole of gas to each 1 and ½ mole). Overall, the higher the temperature the greater the dissociation, the greater the pressure the less the dissociation. Similarly, the concentration of NOx compounds in exhaust gas can be reduced through reductions in temperature by, e.g., decreasing the charge temperature, by reducing compression ratio, through exhaust gas recirculation or by water injection. As has been shown above, the present invention permits the cycle dynamics of the engine to be altered such that a lower compression ratio can be employed to accomplish the same degree of compression occurring in a slider crank engine. Furthermore, in the present invention, the increased acceleration of the piston away from TPP on the expansion stroke prevents pressure and temperature buildup resulting from a flame front which greatly outpaces piston movement. In this manner, the temperature of combustion can be reduced and the rate of expansion of combustion products more closely matched with piston movement with a resultant increase in efficiency and a decrease in CO and NOx emissions.

In addition to the foregoing positive effects of offsetting the crank angle from TPP, an advanced angle also provides an increased moment arm upon which the piston can act. In the slider crank engine, peak compression occurs when the crankpin is disposed at zero degrees when there is no moment arm. As a result, the slider crank engine can do no work while the piston is at TPP. To compensate for this, the ignition is timed so that peak combustion pressure occurs at about 15 degrees after TDC. However, at 15 degrees after TDC, the compression ratio is much less than at TDC. For example, if a slider crank engine has a 9:1 compression ratio, at 15 degrees after TDC the compression ratio is only 5:1. The present invention, by allowing crank angle offsets from TPP, allows the compression ratio to be reduced and the creation of peak combustion pressure at TPP which can be made to correspond, e.g., to a 15 degree crank angle. Of course, if the compression ratio can be reduced to accomplish the same efficiency of combustion as is achieved in an engine using higher compression ratio, pumping losses are reduced.

Figure 16:
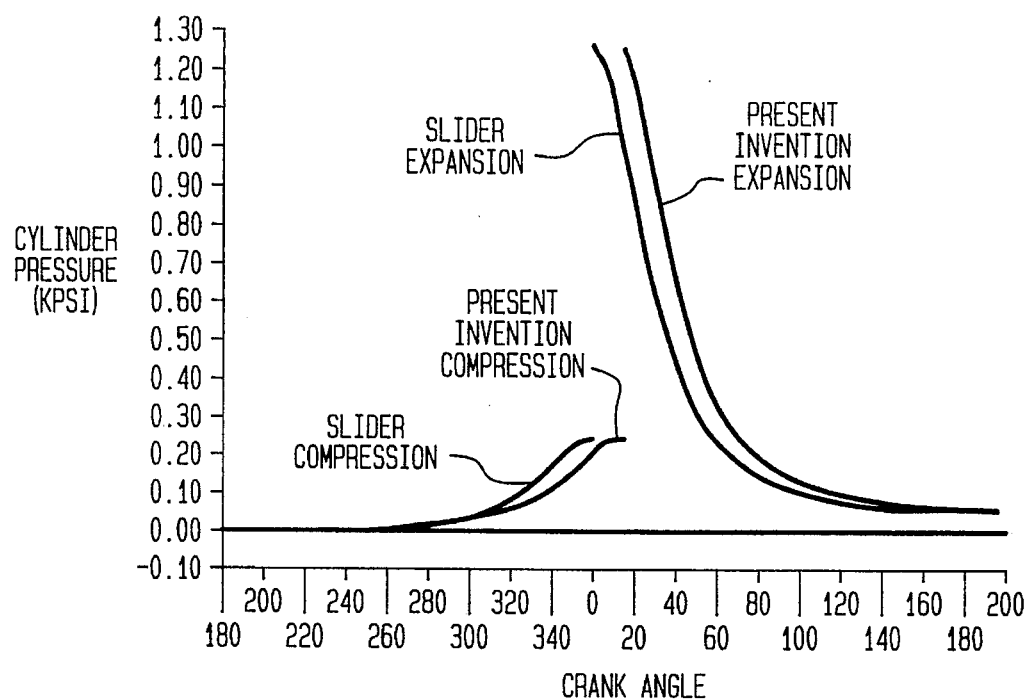
FIG. 16 is a graph of cylinder pressure vs. crank angle comparing the fourth exemplary embodiment of the present invention with the slider crank engine graphed in FIG. 14.
Figure 17:
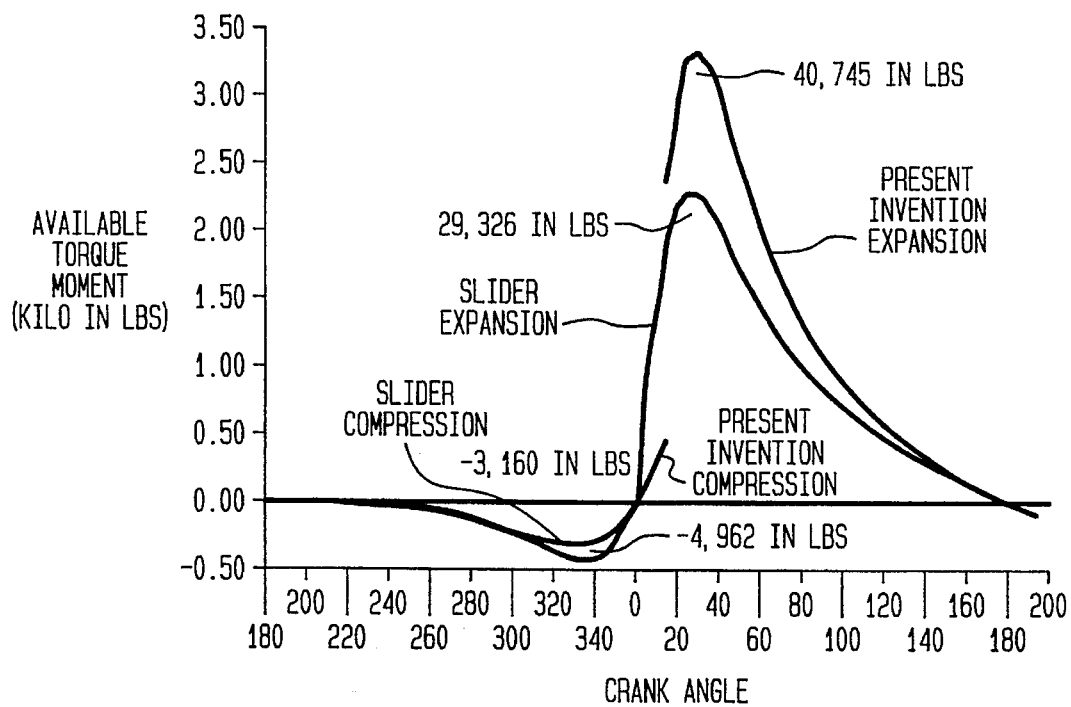
FIG. 17 is a graph of available torque moment vs. crank angle comparing the fourth exemplary embodiment of the present invention with the slider crank engine graphed in FIG. 14.

FIGS. 16 and 17 illustrate the effect of matching peak combustion pressure to an increased moment arm. FIG. 16 shows exemplary cylinder pressures for the present invention with a 15 degrees crank angle offset as compared to the slider crank engine during the compression and expansion (combustion) strokes. As can be appreciated from FIG. 16, the slider crank reaches maximum compression pressure at a crank angle of approximately 0 degrees which corresponds to TDC and TPP. The present invention reaches peak compression pressure at about 15 degrees which corresponds to the TPP. FIG. 17 shows the effect of providing an increased torque arm during peak combustion pressure.

Yet another positive effect from the alteration of cycle dynamics possible due to the conjugate drive of the present invention, is the potential effects upon compression efficiency. The present invention permits greater acceleration of the piston during the first degrees after BPP than can be accomplished with the slider crank engine. This leads to greater compression stroke efficiency in that during the early degrees after BPP when the gas density and pressure are low, the piston is moved further than in slider crank engines. When compression pressures increase, more degrees of crankshaft rotation are dedicated to further compression.

While the present invention has been described in terms of a drive combination with a constant 15 degrees crank angle offset, it should be understood that the conjugate drivers and the conjugate bearings are infinitely variable so that the cycle dynamics may be varied over a wide range.

Figure 18:
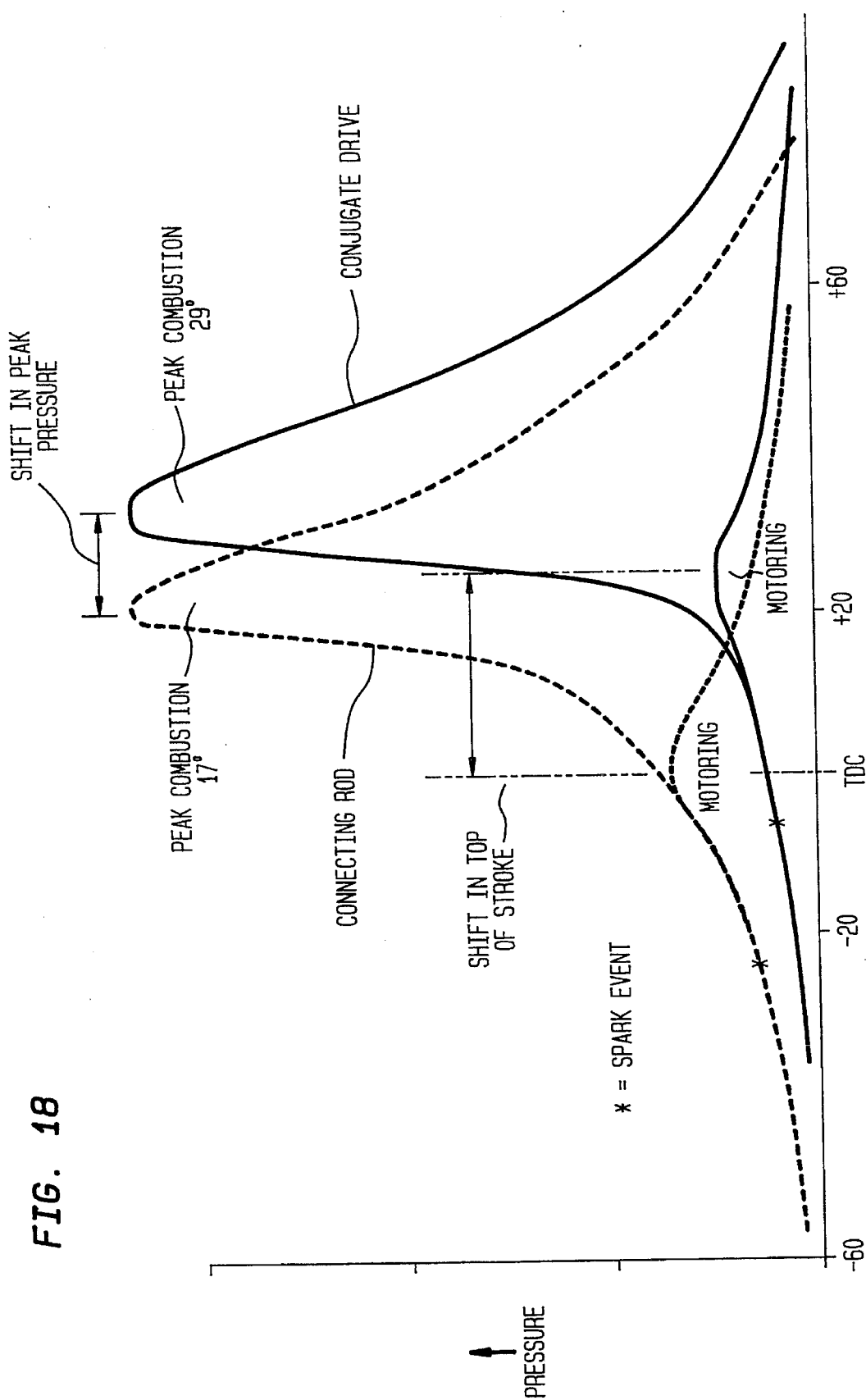
FIG. 18 is a graph of pressure vs. crank angle for a slider crank engine and for a conjugate drive engine in accordance with the present invention.

FIG. 18 is a graph of pressure vs. crank angle for a slider crank cylinder and for a conjugate drive cylinder in an internal combustion engine. Both, the compression (motoring) and expansion (combustion) cycles are illustrated. In the embodiment of the conjugate drive graphed, there is a crank angle advance at top piston position of 24 degrees over the crank angle (O) at top piston position for the slider crank engine graphed. Perhaps most notably, the peak combustion pressure for the conjugate drive engine is only 5 degrees greater than the crank angle (24 degrees) at top piston position. Furthermore, the crank angle of 29 degrees at peak combustion pressure is increased 12 degrees beyond that of the slider at peak combustion (17 degrees) representing a substantial increase in the available movement arm at peak combustion pressure. A comparison of the motoring graphs illustrates that the slider generates significantly more pressure for compression as compared to the present invention representing a greater loss of energy attributable to work expended on compressing the intake charge.

Figure 19:
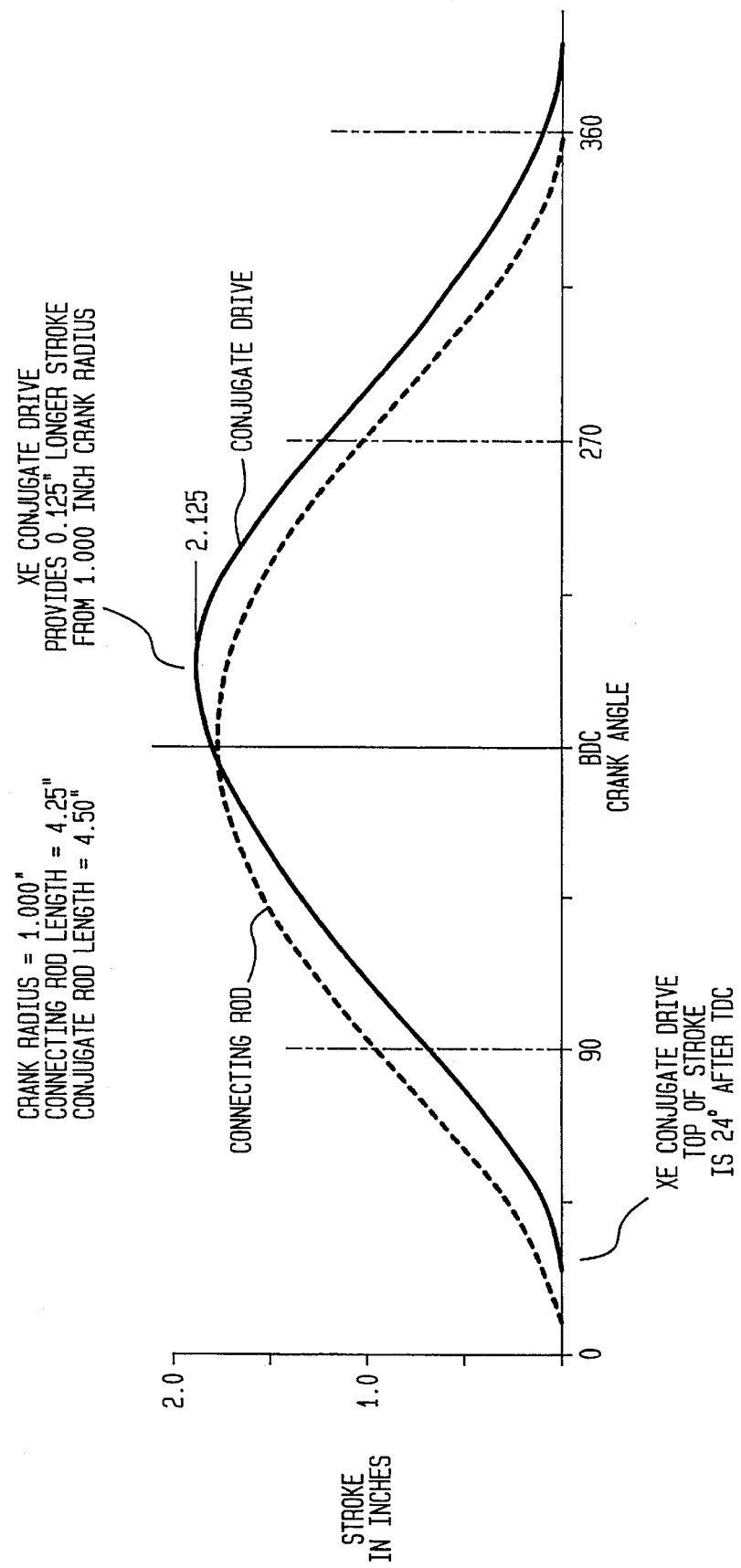
FIG. 19 is a graph of piston position vs. crank angle for a slider crank and for a conjugate drive motion translator in accordance with the present invention.

FIG. 19 is a graph of piston position vs. crank angle for slider crank and conjugate drive type motion translators. The conjugate drive has a 24 degree crank angle advance over the slider crank at top piston position. FIG. 19 shows that the conjugate drive translator may be designed to provide a different stroke length from a crank slider mechanism given a common crank radius (crank pin offset).

Figure 20A:
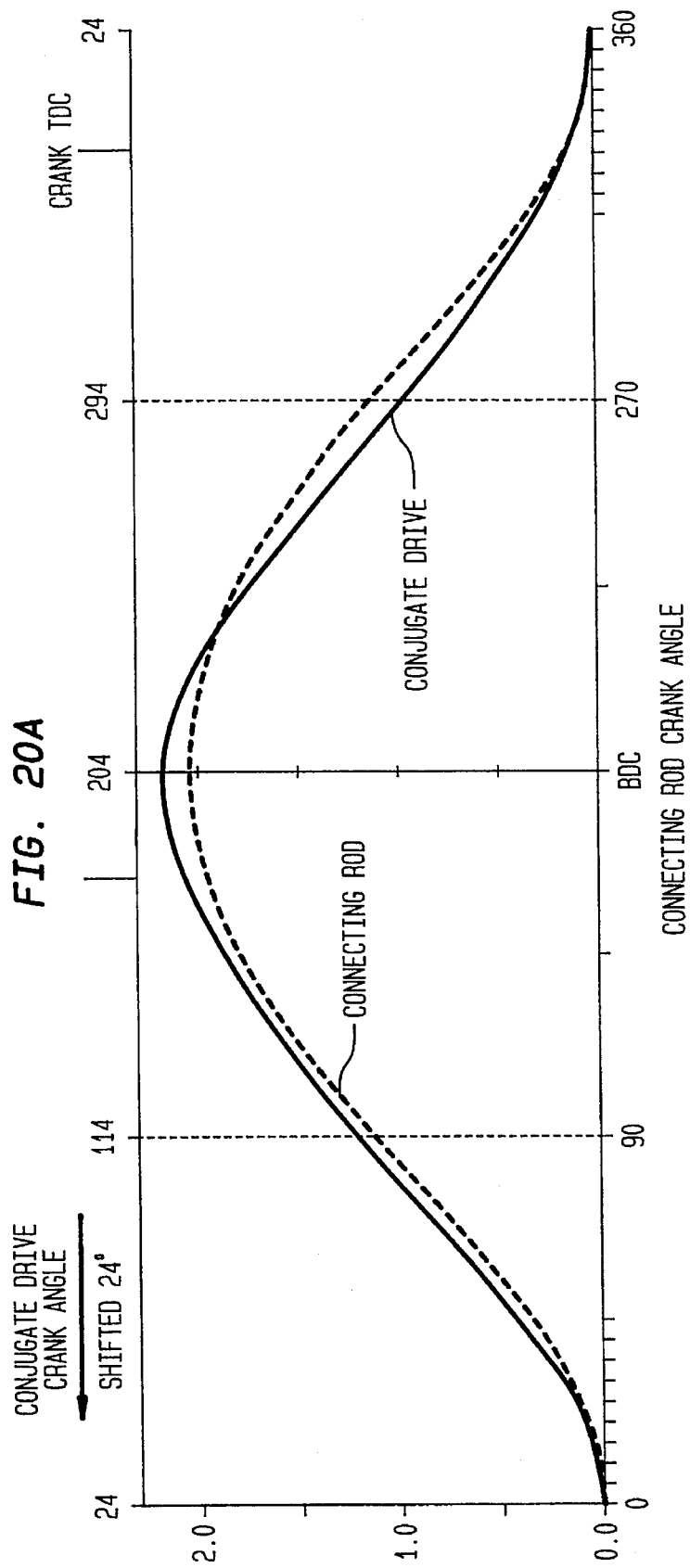
FIG. 20a is the same graph as FIG. 19 with one curve shifted to facilitate comparison of the curves graphed.

FIG. 20*a* is the same graph as FIG. 19 with the conjugate drive curve shifted 24 degrees to enable comparison of the overall shapes of the respective curves. FIG. 20 illustrates that in the embodiment graphed, the cycle dynamics of the respective apparatus differ throughout 360 degrees of crank rotation, that is, the conjugate driver cycle dynamics are not merely those of the slider crank shifted 24 degrees.

Figure 20B:
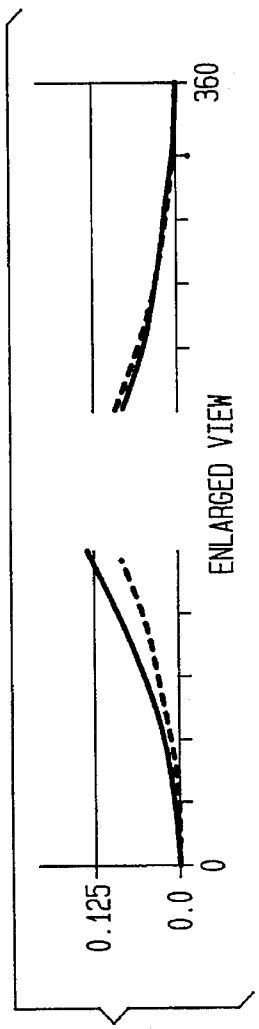

FIG. 20*b* shows the extremes of the graph of FIG. 20*a*, viz., at 0 degrees and 360 degrees, enlarged. The enlarged view confirms that even in those areas of Graph 20*a* where there is an apparent overlap or convergence of behavior, there is in fact a different dynamic occurring.

It should be understood that the embodiments described herein are merely exemplary and that a person skilled in the art may make many variations and modifications without departing from the spirit and scope of the invention as defined in the appended claims.

I claim:

1. A reciprocating piston internal combustion engine having a cylinder for slideably receiving a corresponding mating piston therein moving in synchronous reciprocation relative to the rotation of a crankshaft, comprising:

(a) a shuttle having an aperture therein affixed to said piston, one side of said aperture being defined by a first trackable profile having a first circumferential length and an opposite side of said aperture being defined by a second trackable profile having a second circumferential length, said aperture receiving a crankpin of said crankshaft for interconverting between reciprocating motion of said piston and rotary motion of said crankshaft; and (b) a pair of conjugate drivers independently rotatably mounted side-by-side upon said crankpin, one of said conjugate drivers including a first tracking profile having a third circumferential length, which is equal to said first circumferential length, said other conjugate driver including a second tracking profile having a fourth cicumferential length, which is equal to said second circumferential length, said first and second tracking profiles engaging said first and second trackable profiles, respectively, in a continuous conjugating manner as said crankpin rotates.

2. The engine of claim 1, wherein said portion having a trackable profile is divided into a pair of opposing portions disposed on opposing sides of said aperture, a first mating with a first of said pair of tracking conjugate drivers and the other mating with the other of said pair of tracking conjugate drivers.

3. The engine of claim 2, wherein said opposing portions of said trackable profile are displaced relative each other in a direction along the axis of said crankpin.

4. The engine of claim 3, wherein said tracking conjugate drivers are each rotatable upon said crankpin through 360 degrees when not constrained by said trackable profiles.

5. The engine of claim 3, wherein said first tracking profile of said first conjugate driver has a first continuum of contact lines arranged along the entire circumferential length thereof such that said first contact lines serially contact corresponding contact lines on said first trackable profile, and said second tracking profile has a second continuum of contact lines arranged along the entire circumferential length thereof such that said second contact lines serially contact corresponding contact lines on said second trackable profile.

6. The engine of claim 5, wherein said first trackable profile constitutes a first pitch surface, said second trackable profile constitutes a second pitch surface, said first tracking profile constitutes a third pitch surface, and said second tracking profile constitutes a fourth pitch surface.

7. The engine of claim 6, wherein said tracking conjugate drivers and said trackable profile have mating undulations.

8. The engine of claim 7, wherein said interconverting is characterized by an angular displacement of said crankshaft from 0 degrees at top piston position.

9. The engine of claim 8, wherein said displacement is about 15 degrees.

10. The engine of claim 7, wherein said undulations are uniform.

11. The engine of claim 10, wherein the average pitch line of said undulations in said tracking conjugate drivers is concentric with the axis of rotation of said tracking conjugate drivers.

12. The engine of claim 10, wherein the average pitch line of said undulations in said tracking conjugate drivers is eccentric with the axis of rotation of said tracking conjugate drivers.

13. The engine of claim 5, wherein said tracking conjugate drivers have a bearing surface in contact with said crankpin.

14. The engine of claim 3, further comprising at least one additional piston/cylinder set, wherein said engine is horizontally opposed and said shuttle has a pair of outwardly extending arms radiating in opposite directions from said aperture in said shuttle, each of said arms receiving a piston attached thereto.

15. A reciprocating piston internal combustion engine having a cylinder for slideably receiving a corresponding mating piston therein moving in synchronous reciprocation relative to the rotation of a crankshaft, comprising:

(a) a conjugate drive motion translator having a pair of conjugate drivers independently mounted on a crankpin of said crankshaft for interconverting between reciprocating motion of said piston and rotary motion of said crankshaft, wherein peak compression pressure is achieved at top piston position with the crankpin advanced beyond zero degrees.

16. The engine of claim 15, wherein the piston dwell at top piston position is increased over said slider crank engine.

17. The engine of claim 15, wherein the piston dwell at bottom piston position is increased over said slider crank engine.

18. The engine of claim 15, wherein the moment arm at top piston position is increased over that of said slider crank engine.

19. The engine of claim 15, wherein said piston is accelerated away from top piston position at a greater rate than in said slider crank engine.

20. The engine of claim 15, wherein said piston is accelerated away from bottom piston position at a greater rate than in said slider crank engine.

21. The engine of claim 5, wherein said first conjugate driver and said second conjugate driver are urged into compression against said first trackable profile and said second trackable profile, respectively, such that certain of said first continuum of contact lines and said second continuum of contact lines are expanded into contact bands.

22. The engine of claim 21, wherein the width of said contact bands depends upon the compressive loading of the interface between said first and second conjugate drivers and said first and second trackable profiles, respectively, and the modulus of elasticity of said first and second conjugate drivers and said first and second trackable profiles.

23. The engine of claim 1, wherein each of said first trackable profile, said second trackable profile, said first tracking profile and said second tracking profile are formed from a chain of arcs swept by corresponding radii having distinct centers of curvature disposed on either side of an associated said profile.

24. The engine of claim 5, further including a lubricant introduced between said first and second trackable profiles and said first and second tracking profiles, respectively, said lubricant serving to increase the effective contact area between said trackable profiles and said tracking profiles.

25. The engine of claim 5, wherein the direction and radius of curvature of said first and second tracking profiles at said contact lines are similar to the direction and radius of curvature of said first and second trackable profiles, respectfully, at said corresponding contact lines.

26. The engine of claim 5, wherein said correspondence of said first and second continuum of contact lines on said first and second tracking profiles to said first and second continuum of contact lines on said first and second trackable profiles is substantially repeated for each cycle of said engine.

27. The engine of claim 7, wherein there is no tiproot clearance between said mating undulations.

28. The engine of claim 15, wherein the combustion temperature gradient is lower than a slider crank engine.

29. The engine of claim 28, wherein said lower combustion temperature gradient results in a reduction of the dissociation of carbon dioxide.

30. The engine of claim 15, wherein peak compression pressure is lower than a slider crank engine having a similar peak combustion pressure.

31. The engine of claim 15, wherein compression efficiency is greater than a slider crank engine.

* * * * *